(12) United States Patent
Al-Zaben

(10) Patent No.: US 8,971,843 B2
(45) Date of Patent: *Mar. 3, 2015

(54) COMMUNICATION TRACKING AND BILLING SYSTEM

(75) Inventor: Ibrahim N. Al-Zaben, Jeddah (SA)

(73) Assignee: Amana Future, LLC, Houston, TX (US)

( * ) Notice: Subject to any disclaimer, the term of this patent is extended or adjusted under 35 U.S.C. 154(b) by 91 days.

This patent is subject to a terminal disclaimer.

(21) Appl. No.: 13/525,140

(22) Filed: Jun. 15, 2012

(65) Prior Publication Data

US 2013/0084827 A1 Apr. 4, 2013

Related U.S. Application Data

(60) Provisional application No. 61/541,773, filed on Sep. 30, 2011, provisional application No. 61/576,969, filed on Dec. 16, 2011.

(51) Int. Cl.
  *H04M 11/00* (2006.01)
  *H04M 15/00* (2006.01)
  *H04L 12/14* (2006.01)

(52) U.S. Cl.
  CPC ........... *H04M 15/41* (2013.01); *H04L 12/1439* (2013.01); *H04L 12/1471* (2013.01);
  (Continued)

(58) Field of Classification Search
  CPC ... H04M 2215/32; H04M 15/00; H04W 4/24; H04W 8/245; H04L 29/08108
  USPC ............. 455/405, 406, 407, 408, 409, 414.1, 455/418–420; 379/114.01, 114.05, 114.15, 379/114.2
  See application file for complete search history.

(56) References Cited

U.S. PATENT DOCUMENTS 5,134,651 A * 7/1992 Ortiz et al. ............... 379/144.08
6,871,062 B2 * 3/2005 Trop et al. ..................... 455/406

(Continued)

FOREIGN PATENT DOCUMENTS

| KR | 1020060007453 A | 1/2006 |
| WO | 2005-041597 A1 | 5/2005 |
| WO | 2005041597 A1 | 5/2005 |

OTHER PUBLICATIONS

International Search Report and Written Opinion from PCT/US2012/069568, dated Apr. 3, 2013 (10 pages).

(Continued)

*Primary Examiner* — Steve D Agosta
(74) *Attorney, Agent, or Firm* — Osha · Liang LLP

(57) ABSTRACT

A system for billing communications between a subscriber and a verified professional comprising a verified professional repository and a central tracking system. The central tracking system is configured to receive a communication request targeting the registered device ID, determine an applied billing rate using a value set by the verified professional, and transmit the applied billing rate to the subscriber. The central tracking system is further configured to track the connection, generate a communication data file comprising the registered device ID, the subscriber ID, the applied billing rate, the communication duration, and the billing signal. The central tracking system is further configured to obtain a billable duration by parsing the communication data file using the billing signal and the communication duration, calculate a communication charge using the applied billing rate and billable duration, and pay the verified professional a portion of the communication charge.

21 Claims, 19 Drawing Sheets

(52) U.S. Cl.
CPC .............. *H04M15/07* (2013.01); *H04M 15/43* (2013.01); *H04M 15/61* (2013.01); *H04M 15/62* (2013.01); *H04M 15/68* (2013.01)
USPC ........... 455/406; 455/405; 455/407; 455/408; 455/409; 455/414.1; 455/418; 455/419; 455/420; 379/114.01; 379/114.05; 379/114.14; 379/114.2

(56) References Cited

U.S. PATENT DOCUMENTS

| | | | |
|---|---|---|---|
| 7,457,610 B2* | 11/2008 | Takae et al. | 455/406 |
| 8,116,730 B2* | 2/2012 | Smith | 455/408 |
| 8,355,486 B2* | 1/2013 | Gupta | 379/114.01 |
| 2002/0064261 A1 | 5/2002 | Afana | |
| 2005/0043065 A1 | 2/2005 | Bekanich | |
| 2009/0181642 A1* | 7/2009 | Bekanich | 455/406 |

OTHER PUBLICATIONS

Korean Intellectual Property Office Abstract for Publication No. 10-2006-0007453 dated Jan. 24, 2006 (1 page).

International Preliminary Report on Patentability and Written Opinion from PCT/US2012/069568, dated Jun. 17, 2014 (7 pages).

* cited by examiner

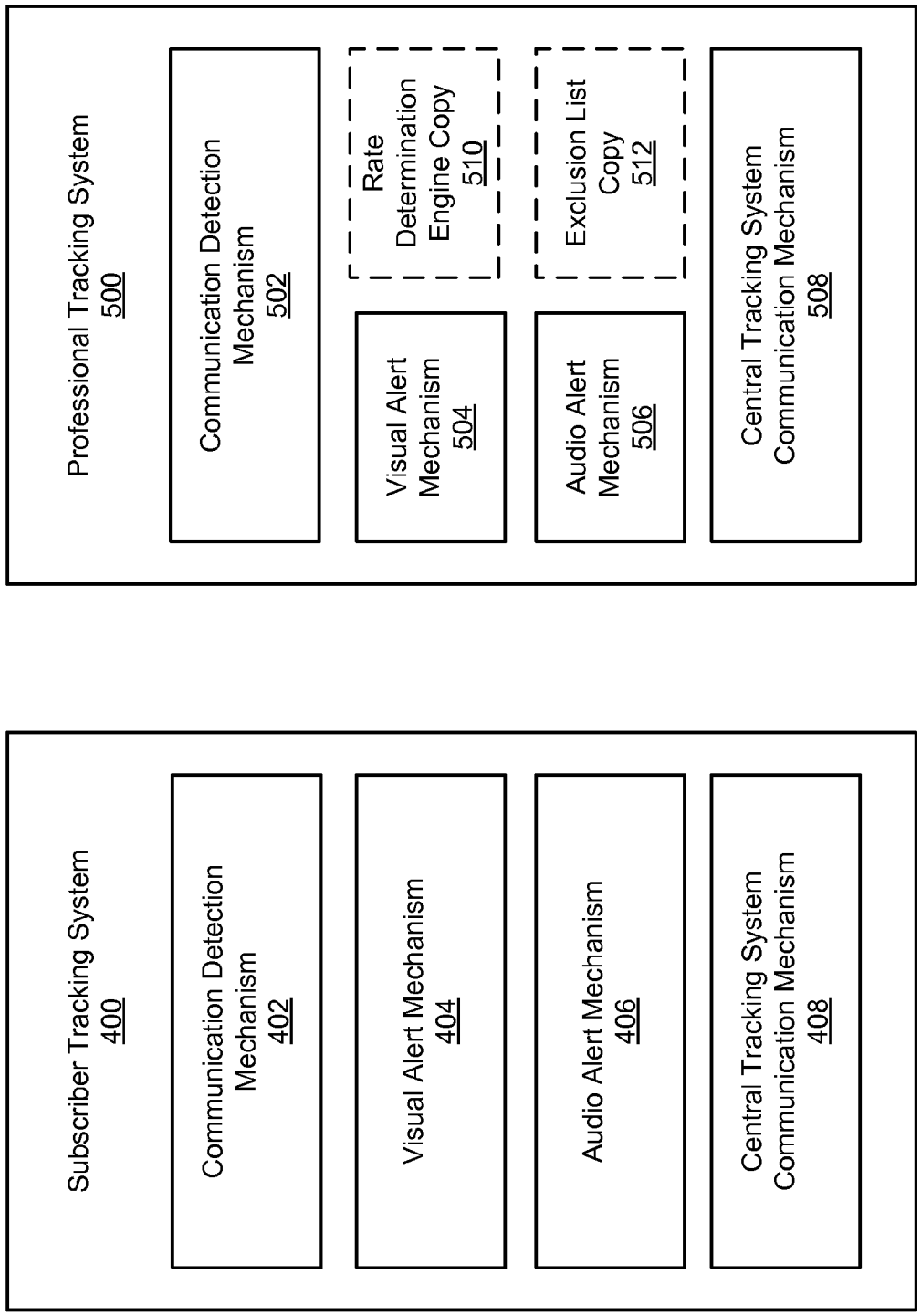

COMMUNICATION TRACKING AND BILLING SYSTEM

CROSS-REFERENCE TO RELATED APPLICATIONS

Pursuant to 35 U.S.C. §119 (e), this application claims benefit of U.S. Provisional Application No. 61/541,773 filed on Sep. 30, 2011, entitled "Communications Tracking and Billing System," and U.S. Provisional Application No. 61/576,969 filed on Dec. 16, 2011, entitled "Communications Tracking and Central Tracking System." The disclosure of the U.S. Provisional Applications are incorporated herein by reference in their entirety.

BACKGROUND

The business of many professional is providing answers and advice to customers. Increasingly, these customers may be in geographically diverse locations relative to the business and professional from whom they seek consultation. Services provided by the professional are often dispersed via electronic communications, such as mobile phone and text communications. This mode of communication is generally more convenient for both professional and customer. However, consultations performed remotely are challenging to track for billing purposes.

SUMMARY

In general, in one aspect, the invention relates to a system for billing communications between a subscriber and a verified professional comprising a verified professional repository and a central tracking system. The verified professional repository comprises a registered device identification (ID) associated with a communication device registered to the verified professional. The central tracking system is configured to receive a communication request targeting the registered device ID from a subscriber communication device associated with a subscriber ID, determine an applied billing rate using a value set by the verified professional, and transmit the applied billing rate to the subscriber communication device. The central tracking system is further configured to initiate a connection between the subscriber communication device and the communication device registered to the verified professional, track the connection to obtain a communication duration and a billing signal, and initiate a termination of the connection between the subscriber communication device and the communication device registered to the verified professional. The central tracking system is further configured to generate a communication data file comprising the registered device ID, the subscriber ID, the applied billing rate, the communication duration, and the billing signal, obtain a billable duration by parsing the communication data file using the billing signal and the communication duration, calculate a communication charge using the applied billing rate and billable duration, and pay the verified professional a portion of the communication charge.

In general, in one aspect, the invention relates to a method for billing communications between a subscriber and a verified professional. The method comprises receiving a communication request targeting a registered device identification (ID) from a subscriber communication device, wherein the registered device ID is associated with a communication device registered to a verified professional, and wherein the subscriber communication device is associated with a subscriber ID. The method further comprises determining an applied billing rate using a value set by the verified professional, transmitting the applied billing rate to the subscriber communication device, and initiating a connection between the subscriber communication device and the communication device registered to the verified professional. The method further comprises tracking the connection to obtain a connection duration and a billing signal, terminating the connection between the subscriber communication device and the communication device registered to the verified professional, and generating a communication data file comprising the registered device ID, the subscriber ID, the applied billing rate, the connection duration, and the billing signal. The method further comprises obtaining a billable duration by parsing the communication data file using the billing signal and the connection duration, calculating a communication charge using the applied billing rate and billable duration, and paying the verified professional a portion of the communication charge.

In general, in one aspect, the invention relates to computer readable medium comprising instructions for billing communications between a subscriber and a verified professional, wherein the instructions, when executed, perform a method. The method comprises receiving a communication request targeting a registered device identification (ID) from a subscriber communication device, wherein the registered device ID is associated with a communication device registered to a verified professional, and wherein the subscriber communication device is associated with a subscriber ID. The method further comprises determining an applied billing rate using a value set by the verified professional, transmitting the applied billing rate to the subscriber communication device, and initiating a connection between the subscriber communication device and the communication device registered to the verified professional. The method further comprises tracking the connection to obtain a connection duration and a billing signal, terminating the connection between the subscriber communication device and the communication device registered to the verified professional, and generating a communication data file comprising the registered device ID, the subscriber ID, the applied billing rate, the connection duration, and the billing signal. The method further comprises obtaining a billable duration by parsing the communication data file using the billing signal and the connection duration, calculating a communication charge using the applied billing rate and billable duration, and paying the verified professional a portion of the communication charge.

BRIEF DESCRIPTION OF DRAWINGS

FIG. 4 shows a subscriber tracking system in accordance with one or more embodiments of the invention.

FIG. 5 shows a professional tracking system in accordance with one or more embodiments of the invention.

DETAILED DESCRIPTION

Figure 1:
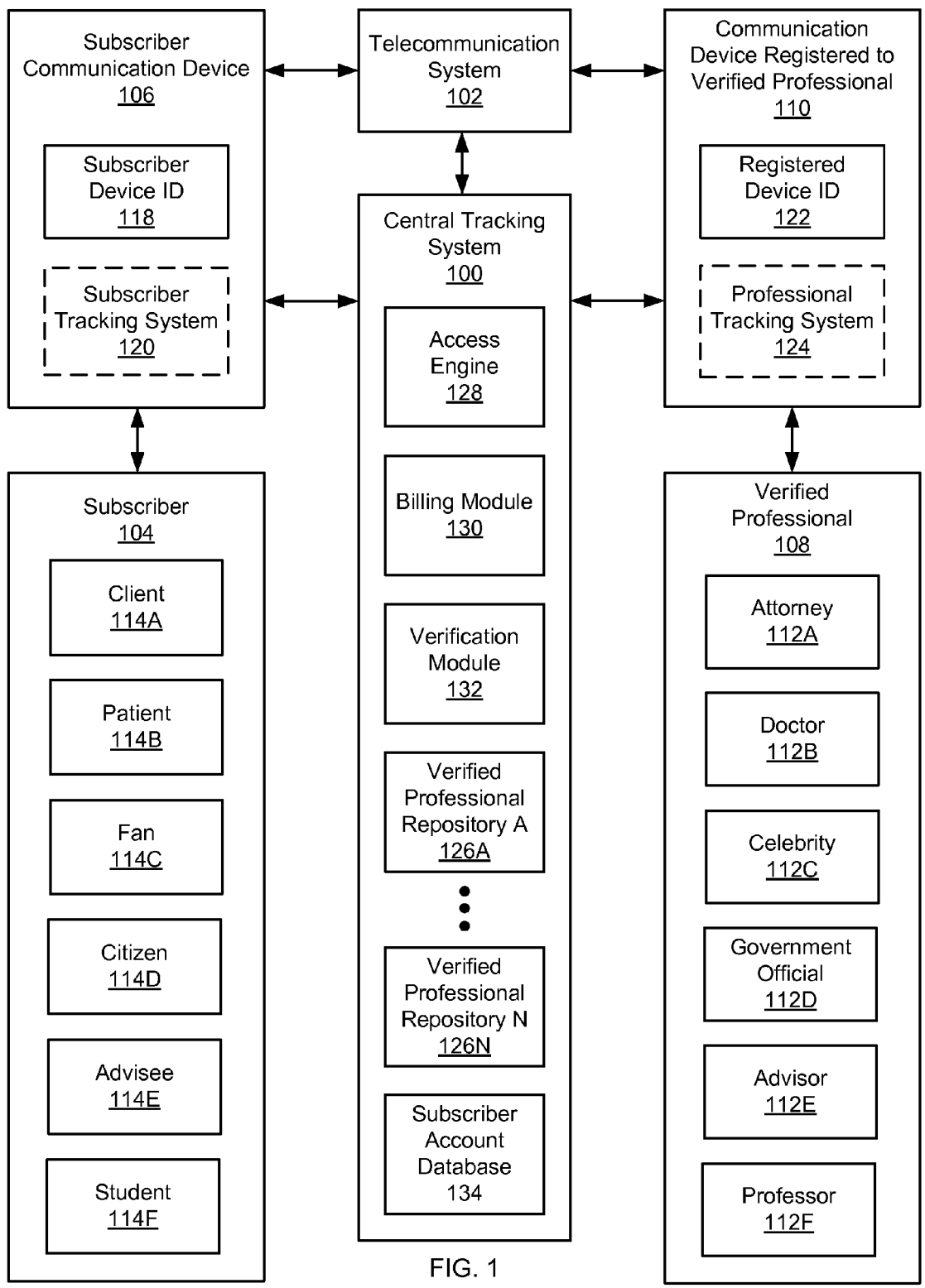
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for tracking and billing communications between verified professionals and subscribers. One or more embodiments of the invention may be used to issue a payment to a verified professional based on communications with one or more subscribers. Further, embodiments of the invention may be used to generate a corresponding charge to a subscriber based on communications with a verified professional.

FIG. 1 shows a system in one or more embodiments of the invention. As shown in FIG. 1, the system includes a central tracking system (100) associated with a telecommunication system (102) facilitating communication between a subscriber (104) using a subscriber communication device (106) and a verified professional (108) using a communication device registered to a verified professional (110). Each of these elements is discussed below.

In one or more embodiments of the invention, a verified professional (108) is an identity recognized by a subscriber (104) who is targeted for a communication from the subscriber (104). In one embodiment of the invention, verified professionals are compensated for making themselves available to receive communications from subscribers (104). In one embodiment of the invention, a recognized identity may become a verified professional (108) using the verification process described below in regard to FIG. 4. As used herein, the terms identity and professional are interchangeable, and may encompass any entity targeted for communication by a subscriber (104). Examples of identities who may utilize embodiments of the invention include, but is not limited to, attorneys (112A), doctors (112B), celebrities (112C), government officials (112D), advisors (112E), and professors (112F). In one embodiment of the invention, an identity may refer to more than one person. For example, an identity may include an athlete and the athlete's human translator. In one embodiment of the invention, identities may also include non-human or non-living entities. For example, an identity may include an assistive device used by a person to translate gesturers into speech. Further, identities may include an entity portraying a fictional character for the purposes of the communication. For example, an identity may be a voice actor portraying a cartoon character or avatar. In one embodiment of the invention, the identity may be a payee or receiver of monetary funds transferred from a subscriber. Those skilled in the art will recognize that the types of identities listed in FIG. 1 are limited examples, and that other types of identities may utilize the system without exceeding the scope of the invention.

In one or more embodiments of the invention, a subscriber (104) is an entity initiating a communication with a verified professional (108). Examples of subscribers include clients (114A), patients (114B), fans (114C), citizens (114D), advisees (114E), and students (114F). For example, a subscriber (104) may be a student (114F) contacting a verified professional (108) who is the student's professor (112F). The student (114F) may be contacting the professor (112F) outside of normal school hours, and therefore may be willing to pay for the convenience of communicating with the professor (112F). In one embodiment of the invention, the subscriber (104) may have an indirect relationship with the verified professional (108). For example, the subscriber (104) may be a parent of the student (114F) contacting the student's professor (112F) to obtain information about the student's progress or performance.

In one embodiment of the invention, the subscriber may be a payer or sender of monetary funds transferred to a verified professional. Those skilled in the art will recognize that the types of subscribers listed in FIG. 1 are limited examples, and that other types of identities may utilize the system without exceeding the scope of the invention.

In one or more embodiments of the invention, the subscriber communication device (106) is any hardware or hardware-software combination used by a subscriber to initiate the communication with the verified professional. In one embodiment of the invention, the subscriber communication device (106) is a mobile phone, smartphone, or personal digital assistant connected to the telecommunication system (102). The subscriber communication device (106) includes a subscriber device ID (118), which identifies the device to the telecommunication system (102) and the central tracking system (100). The subscriber communication device (106) may optionally include a subscriber tracking system (120).

For example, a subscriber communication device may be a personal computer configured to send and receive voice calls over a network. In this example, the subscriber device ID may be a media access control (MAC) address of the computer's network card. The subscriber tracking system may be an application executing on the personal computer.

In one or more embodiments of the invention, the communication device registered to a verified professional (108) is any hardware or hardware-software combination used by a verified professional to receive or respond to the communication with the subscriber. In one embodiment of the invention, the communication device registered to a verified professional (108) is a mobile phone, smartphone, or personal digital assistant connected the telecommunication system (102). The communication device registered to a verified professional (108) includes a registered device ID (122) which identifies the device to the telecommunication system (102) and the central tracking system (100). The communication device registered to a verified professional (108) may also include a professional tracking system (124).

In one or more embodiments of the invention, communications sent between the subscriber communication device (106) and the communication device registered to a verified professional (108) are transmitted via the telecommunication system (102). In one embodiment of the invention, the communications are sent across the telecommunication system (102) as voice and text message communications. In one embodiment of the invention, the communications are sent via a network connection between the device and a communication network (e.g. a connection to the Internet). The network connection may be provided by the telecommunication system (102).

In one or more embodiments of the invention, the telecommunication system (102) may be a telecommunication company or group of companies, internet service providers or group of providers, satellite communications provider, radio communications provider, or any other system or group of systems capable of transferring voice or data between a subscriber communication device (106) and a communication device registered to a verified professional (108). For example, the telecommunications system may be a combination of a home digital subscriber line (DSL) internet provider and a voice-over-internet-protocol (VOIP) provider. The VOIP data is transmitted between the subscriber device and the device registered to the verified professional using the DSL internet connection.

In one or more embodiments of the invention, the telecommunication system (102) tracks communications between a subscriber communication device (106) and a communication device registered to a verified professional (108). Tracking activities may include, for example, a duration of a communication, the physical location of the subscriber communication device and the communication device registered to a verified professional (108), and the time a communication took place. As used herein, the term duration refers to a communication unit, and may include, for example, the time duration of a voice call, the time duration of an audio message, the number of text messages, the size of a text message, the number of images, and the size of an image.

In one embodiment of the invention, the telecommunication system (102) gathers tracking activity information from the communication device registered to a verified professional (108) and provides that information to the central tracking system (100). The tracking activity may be provided to the central tracking system (100) in the form of a bill for the network resources used by the communication device registered to a verified professional (108). For example, for a subscriber device and a device registered to a verified professional implemented as cellular phones, the cellular telecommunication provider may track all incoming and outgoing calls from each cellular phone.

In one embodiment of the invention, tracking activities are monitored by the central tracking system (100) from information gathered directly or indirectly from the subscriber communication device and the communication device registered to a verified professional (108). Tracking activities may be monitored by the central tracking system (100) in addition to or instead of the monitoring performed by the telecommunication system (102). In one or more embodiments of the invention, the tracking activities are monitored using the subscriber tracking system (120) and the professional tracking system (124). For example, the subscriber tracking system and the professional tracking system may be implemented as applications executing on smartphones. In this case, the applications may store tracking information and transmit that information back to the central tracking system periodically.

In one embodiment of the invention, the telecommunication system (102) operates unaware of the financial transactions between the central tracking system (100), verified professional (108), and subscriber (104). In one embodiment of the invention, the telecommunications system only provides the communication infrastructure to transfer voice and data between the subscriber communication device (106) and the communication device registered to a verified professional (108), and to track the data and voice usage of the devices.

In one embodiment of the invention, the communication device registered to a verified professional (108) is initially obtained by the central tracking system (100) and connected to the telecommunications system (102). The telecommunications system (102) may operate as though the central tracking system (100) is a telecommunications customer, and may invoice the central tracking system (100) for the network resources used by the devices registered to the central tracking system (100) (such as the communication device registered to a verified professional (108)). As in the example discussed above, for a subscriber device and a device registered to a verified professional implemented as cellular phones, the cellular telecommunication provider may track all incoming and outgoing calls from each cellular phone. The cellular phones and service plans may be purchased directly by the central tracking system and the phones are provided to the subscriber and verified professional directly from the central tracking system. In this example, the cellular telecommunication provider will send the call report as part of a bill for the service plan provided to the central tracking system.

In one embodiment of the invention, the invoicing between the telecommunications system (102) and the central tracking system (100) may be according to an agreed-upon plan, which may be on an individual wireless plan or an enterprise wireless plan. In one embodiment of the invention, the invoices are sent from the telecommunications system (102) to the central tracking system (100), and payments are made by the central tracking system (100) to the telecommunications system (102). In one embodiment of the invention, payments are not sent from the telecommunications system (102) to the central tracking system (100) unless due to an accounting error (such as overcharge or overpayment).

In one or more embodiments of the invention, the central tracking system (100) alerts the subscriber (104) using a subscriber communication device (106) of the billing rate applied to requested communication between the subscriber communication device (106) to the communication device registered to a verified professional (108) targeted by the subscriber (104). In one embodiment of the invention, the applicable billing rate is provided using the subscriber tracking system (120) and the professional tracking system (124). For example, the professional's applied billing rate may be stored in the professional tracking system on the device registered to the verified professional. When a subscriber initiates a communication, the central tracking system retrieves the applied billing rate from the professional tracking system and transmits the rate to the subscriber tracking system on the subscriber communication device.

In one embodiment of the invention, the central tracking system (100) includes an access engine (128), a billing module (130), a verification module (132), a number of verified professional repositories (VPR) (VPR A (126A), VPR N (126N)), and a subscriber account database (134).

In one or more embodiments of the invention, the access engine (128) is a program or group of programs configured to provide user access to the various other elements within the central tracking system (100). In one embodiment of the invention, the professional tracking system (124) and the subscriber tracking system (120) each communicate with the central tracking system (100) via the access engine (128). In one embodiment of the invention, the access engine (128) includes other communication interfaces in order to receive and service requests from professionals and subscribers. Such communication interfaces may include an interactive website accessible over the Internet.

In one embodiment of the invention, the access engine (128) includes the functionality to authenticate and authorize users attempting to access different elements within the central tracking system. Authentication may include validating a username and password of a verified professional or subscriber. Authorization may include determining which data elements the authenticated user should be allowed to access. In one or more embodiments of the invention, the access engine (128) also determines whether a subscriber is authorized to initiate a communication with a verified professional. In one embodiment of the invention, the access engine (128) determines whether a non-subscriber may initiate a communication with a verified professional. Authorization to initiate a communication may involve querying one or more elements of a VPR.

In one or more embodiments of the invention, the billing module (130) is a program or group of programs that determine payments and debits to be made between a verified professional and a subscriber. Further detail regarding the processes performed by the billing module (130) are described in FIG. 8.

In one or more embodiments of the invention, the verification module (132) is program or group of programs configured to gather verification information about an identity, and to generate a VPR for a verified professional. Further detail regarding the processes performed by the verification module (132) are described in FIG. 6.

In one or more embodiments of the invention, the subscriber account database (134) is a repository of account data associated with subscribers utilizing the central tracking system (100). Each subscriber account may include, for example, payment information, subscriber identity information, and subscriber device information.

Figure 2:
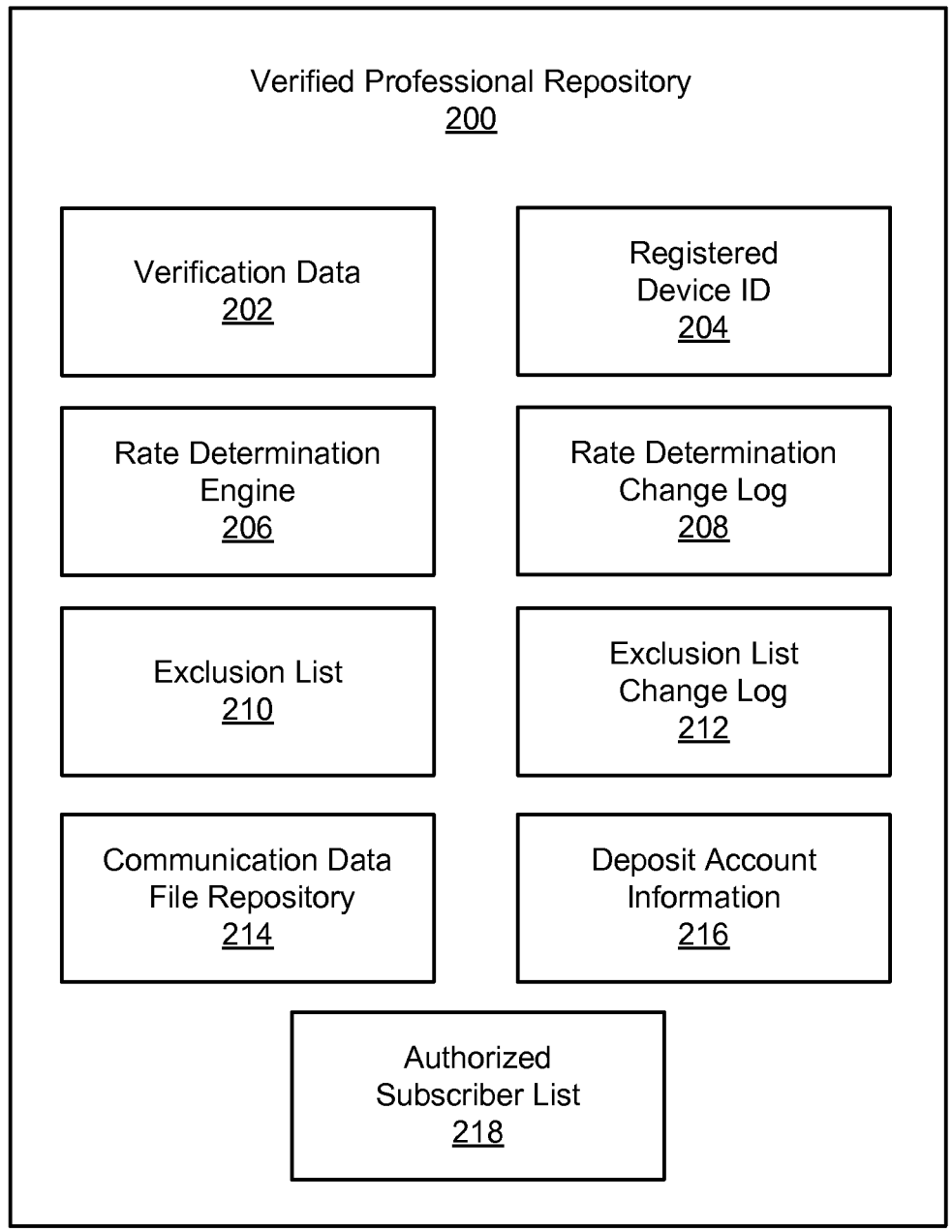
FIG. 2 shows a verified professional repository in accordance with one or more embodiments of the invention.

FIG. 2 shows a VPR (200) in one or more embodiments of the invention. As shown in FIG. 2, the VPR (200) includes verification data (202), a registered device ID (204), a rate determination engine (206), a rate determination change log (208), an exclusion list (210), an exclusion list change log (212), a communication data file (CDF) repository (214), deposit account information (216), and an authorized subscriber list (218).

In one embodiment of the invention, verification data (202) includes data used by the verification module of the central tracking system to verify the identity of the professional. Verification data (202) may also be used to verify the credentials of the professional. The verification process is described in more detail below in regard to FIG. 4.

In one embodiment of the invention, a registered device ID (204) is a unique mark used to distinguish one communication device from another within a communications system. Examples of registered device IDs (204) include a phone number, a device serial number, and a wireless communication address assigned to the device (e.g. a MAC address).

In one embodiment of the invention, a rate determination engine (206) is a value or algorithm used to determine the applied billing rate for a call. In one embodiment of the invention, the rate determination engine (206) stores a single rate value to be applied to all communications (e.g., $3.00 per minute). In one embodiment of the invention, the rate determination engine (206) includes different values depending on the time of day, the day of the week, or the detected physical location of the communication device registered to the verified professional (e.g., $3.00 per minute before 6 pm, $5.00 per minute after 6 pm, $10.00 per minute on weekends, $20.00 per minute if the professional tracking system detects that the professional is out of town). Changes made to the rate determination engine (206) may be stored in the rate determination change log (208). In one embodiment of the invention, the value is set directly by the verified professional. In one embodiment of the invention, the verified professional sets the value by contacting the central tracking system and identifying herself to the central tracking system using a password, pin number, or personal information known only to the professional and the central tracking system.

In one embodiment of the invention, the exclusion list (210) is a list of devices for which communications will not be initially charged. For example, a verified professional may request that subscriber communication devices used by the verified professional's family or coworkers not be charged to initiate a call. In this case, the subscriber device IDs would be added to the verified professional's exclusion list (210). Changes to the exclusion list (210) may be stored in the exclusion list change log (212).

In one embodiment of the invention, a communication data file (CDF) repository (214) is a data file containing CDFs generated from communications with the communication device registered to the verified professional. A detailed explanation of CDFs is provided below in regard to FIG. 3.

In one embodiment of the invention, deposit account information (216) is data used by the verification module of the central tracking system to submit payment to the verified professional. In one embodiment of the invention, deposit account information (216) includes the routing and account number of a verified professional's bank account. In one embodiment of the invention, deposit account information (216) includes instructions to mail a check to a specified address.

In one or more embodiments of the invention, the authorized subscriber list (218) is a list of subscribers authorized to contact the verified professional. In one embodiment of the invention, a verified professional limits the subscribers that may initiate a communication to only those subscribers identified by entries within the authorized subscriber list. For example, a patient may visit a doctor and request to contact that doctor via the central tracking system. The doctor may then access their VPR and add the patient to the authorized subscriber list (using the patient's device identifier, name, or other patent data indexed within the central tracking system). Thereafter, the patent may initiate a communication with the doctor.

Figure 3:
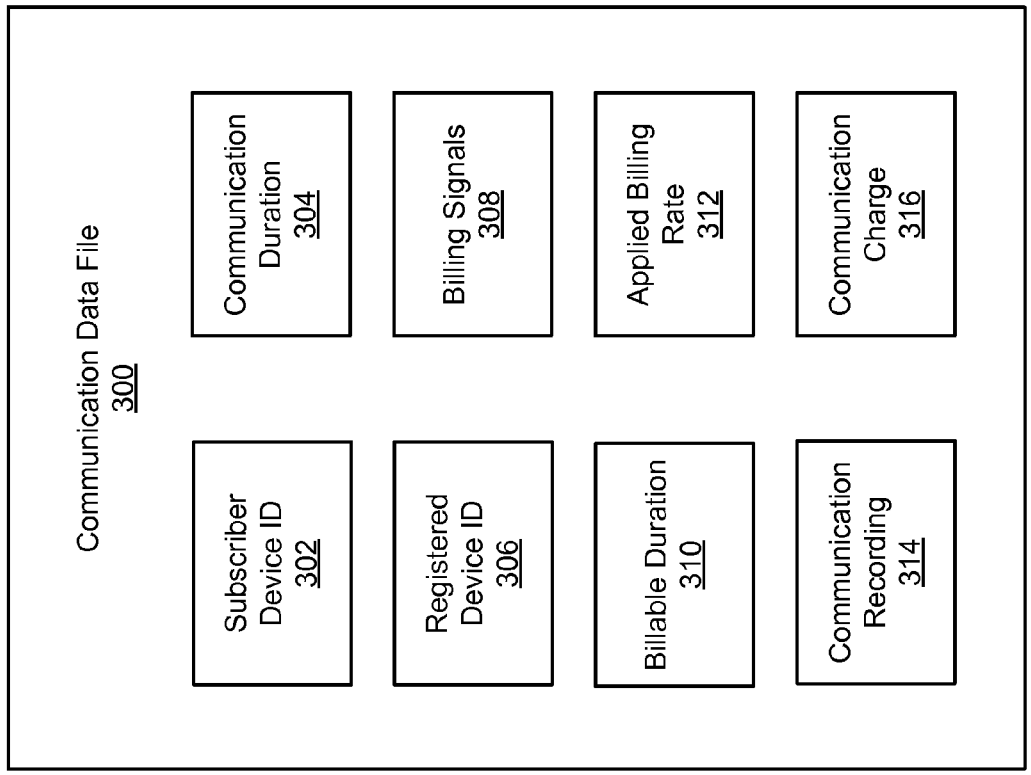
FIG. 3 shows a communication data file in accordance with one or more embodiments of the invention.

FIG. 3 shows a CDF (300) in one or more embodiments of the invention. As shown in FIG. 3, the CDF (300) includes a subscriber device ID (302), a communication duration (304), a registered device ID (306), one or more billing signals (308), a billable duration (310), an applied billing rate (312), a communication recording (314), and a communication charge (316).

In one embodiment of the invention, a subscriber device ID (302) is a unique mark used to distinguish one communication device from another within a communications system. Examples of subscriber device IDs (302) include a phone number, a device serial number, and a wireless communication address assigned to the device. In one embodiment of the invention, the registered device ID (306) and subscriber device ID (302) both of the same type (e.g., both phone numbers).

In one embodiment of the invention, a communication duration (304) is a communication unit of a communication between a subscriber communication device and a communication device registered to a verified professional. In one embodiment of the invention, the communication duration (304) may be measured differently depending on the type of communication. For example, the communication duration (304) of a voice call may be in time units (e.g., minutes), the communication duration (304) of a text message may be in number of characters or number of sets of characters, and the communication duration (304) of a video call may be in terms of amount of data exchanged to maintain the video call (e.g., megabytes of data).

In one embodiment of the invention, billing signals (308) are inputs received automatically or from the verified professional during the communication. In one embodiment of the invention, billing signals (308) indicate a change to the billable duration (310). As another example, a verified professional may generate a billing signal (308) during a communication with a subscriber on the exclusion list if the conversation transitions from a personal call to a business call. In one embodiment of the invention, a billing signal (308) may indicate that the entire charge for the call should be canceled. In one embodiment of the invention, billing signals (308) may be set using a number pad on the communication device, where each number may trigger a different billing signal (e.g. 1=begin charging, 2=cancel charge, 3=stop recording, etc.)

In one embodiment of the invention, a billing signal may be used by the verified professional to start or stop the communication recording (314). In one embodiment of the invention, a billing signal (308) is generated by a verified professional pressing a button to start recording the communication or stop recording the communication. In one embodiment of the invention, the billing signal is generated by a user interacting with a communication detection mechanism in the professional tracking system (e.g., a graphic presented on the display of a touch screen).

In one embodiment of the invention, a billable duration (310) is the portion of the communication duration (304) for which the verified professional has requested be billed. In one embodiment of the invention, the billable duration (310) is calculated using the communication duration (304) and the billing signals (308). For example, a communication duration for a call may be three minutes, and there may be a billing signal indicating that the billing should stop after the first minute. In this case, the billable duration is one minute.

In one embodiment of the invention, an applied billing rate (312) is the cost per communication unit calculated when the communication was initialized. In one embodiment of the invention, the applied billing rate is determined using the rate determination engine of the VPR.

In one embodiment of the invention, a communication recording (314) is a recording of the communication made automatically or at the request of the verified professional. In one embodiment of the invention, the communication recording (314) may be an audio recording or a text file representing the communication. In one embodiment of the invention, the communication recording (314) may be encrypted, and may be provided only to requesting government authorities.

In one embodiment of the invention, the communication charge (316) is the total amount calculated to be billed to the subscriber. In one embodiment of the invention, the communication charge (316) is generated by applying the applied billing rate (312) to the billable duration (310). For example, if a call was made during a period of time at which the professional has set the applied billing rate to $4.00 per minute, and the billable duration is $2.00 minutes, then the communication charge will be calculated as $8.00.

In one embodiment of the invention, a CDF may also be used to store data about a direct monetary transfer. In such a case, a direct monetary transfer CDF may differ from the CDF as described above.

FIG. 4 shows a subscriber tracking system (400) in one or more embodiments of the invention. As shown in FIG. 4, the subscriber tracking system (400) includes a communication detection mechanism (402), a visual alert mechanism (404), an audio alert mechanism (406), and a central tracking communication mechanism (408).

In one embodiment of the invention, the communication detection mechanism (402) detects outgoing communications targeting a device registered to a verified professional. In one embodiment of the invention, the communication detection mechanism (402) also detects incoming communications originating from a device registered to a verified professional. Outgoing and incoming communications detected by the communication detection mechanism (402) may include calls, text communications, audio messages, and multimedia communications. The communication detection mechanism (402) may also obtain a registered device ID associated with the origin or target of the communication.

In one embodiment of the invention, the communication detection mechanism (402) also generates billing signals in response to receiving input from a user. The communication detection mechanism (402) may also be used to generate a recording of a detected communication.

In one embodiment of the invention, the visual alert mechanism (404) and the audio alert mechanism (406) convey alerts to the subscriber triggered by the communication detection mechanism (402) or the central tracking communication mechanism (408). In one embodiment of the invention, the visual alert mechanism (404) and the audio alert mechanism (406) may also be used to present a prompt to obtain user input, such as a billing signal. For example, the visual alert mechanism may present a "record" button to the user. When the user pushes the "record" button, the communication detection mechanism (402) will generate a corresponding billing signal for the communication (e.g. a point at which to start or stop recording a call).

In one embodiment of the invention, the central tracking communication mechanism (408) is used to exchange and update information with the central tracking system. In one embodiment of the invention, the central tracking communication mechanism (408) transmits information to the central tracking system about communications detected by the communication detection mechanism (402) (e.g., subscriber phone number, billing signals, etc.). In one embodiment of the invention, the central tracking communication mechanism (408) receives information from the central tracking system, such as alerts to be presented to the subscriber via the visual alert mechanism (404) and the audio alert mechanism (406) (e.g., applied billing rate for a target device ID, etc)

In one or more embodiments of the invention, the subscriber tracking system (400) also includes a directory of verified professionals. In one embodiment of the invention, each entry in the directory of verified professionals may include the verified professional's name, credentials, phone number, applied billing rate, and a rating compiled by other subscribers who have contacted the verified professional.

In one or more embodiments of the invention, the subscriber tracking system (400) includes functionality to query the central tracking system to determine the status of a professional. Specifically, a professional may set a status indicator via the professional tracking system that indicates whether the professional is currently accepting communications. The subscriber tracking system (400) may query the central tracking system to obtain the current status of a specified professional. If the status for professional indicates that the professional is not currently accepting communications, the subscriber may be given the opportunity to leave a message for the professional. The subscriber tracking system (400) may further include functionality to alert a subscriber if the status indicator associated with a professional changes (e.g., from a status of not accepting communications to a status of accepting communications). Such an alert system allows a subscriber to initiate a communication with a professional as soon as the professional begins accepting communications.

FIG. 5 shows a professional tracking system (500) in one or more embodiments of the invention. As shown in FIG. 5, the professional tracking system (500) includes a communication detection mechanism (502), a visual alert mechanism (504), an audio alert mechanism (506), and a central tracking communication mechanism (508), substantially similar to those elements as described with respect to FIG. 4.

In one embodiment of the invention, the professional tracking system (500) also optionally includes a rate determination engine copy (510) and an exclusion list copy (512). In one embodiment of the invention, these elements are kept synchronized with the rate determination engine (206 of FIG. 2) and exclusion list (210 of FIG. 2) stored in the VPR (200 of FIG. 2) associated with the device registered to the verified professional. In one embodiment of the invention, updates to the rate determination engine copy (510) and the exclusion list copy (512) are sent to the professional tracking system (500) via the central tracking communication mechanism (508).

In one or more embodiments of the invention, the professional tracking system (500) includes functionality to set a status indicator on the central tracking system indicating whether the professional is currently accepting communications, and what kind of communications the professional is currently accepting. The central tracking system may then be queried by a subscriber tracking system to inform the subscriber of the current status of the professional.

In one or more embodiments of the invention, the subscriber tracking system (400) and the professional tracking system (500) may also includes an accounting of previous communications and communication charges, include totals for a current or previous time period. In one or more embodiments of the invention, the subscriber tracking system (400) and the professional tracking system (500) may also include the ability to retrieve recordings of previous communications. In one embodiment of the invention, the subscriber tracking system (400) and the professional tracking system (500) may also include controls allowing the subscriber to navigate the recording (e.g., fast forward, skip, pause, etc.).

In one or more embodiments of the invention, the subscriber tracking system (400) and the professional tracking system (500) also include a mechanism to display information about the subscriber or verified professional during the call. For example, a call placed by a patient to a doctor may trigger the professional tracking system (500) to present the patient's medical chart on the communication device registered to the verified professional. In this example, the patient may also be able to view changes made by the doctor to the chart via the subscriber tracking system (400) on the subscriber communication device. In one embodiment of the invention, the displayed information is triggered automatically when the call is connected, or may be displayed after either the subscriber or verified professional identifies themselves or the other to the mechanism.

Figure 6:
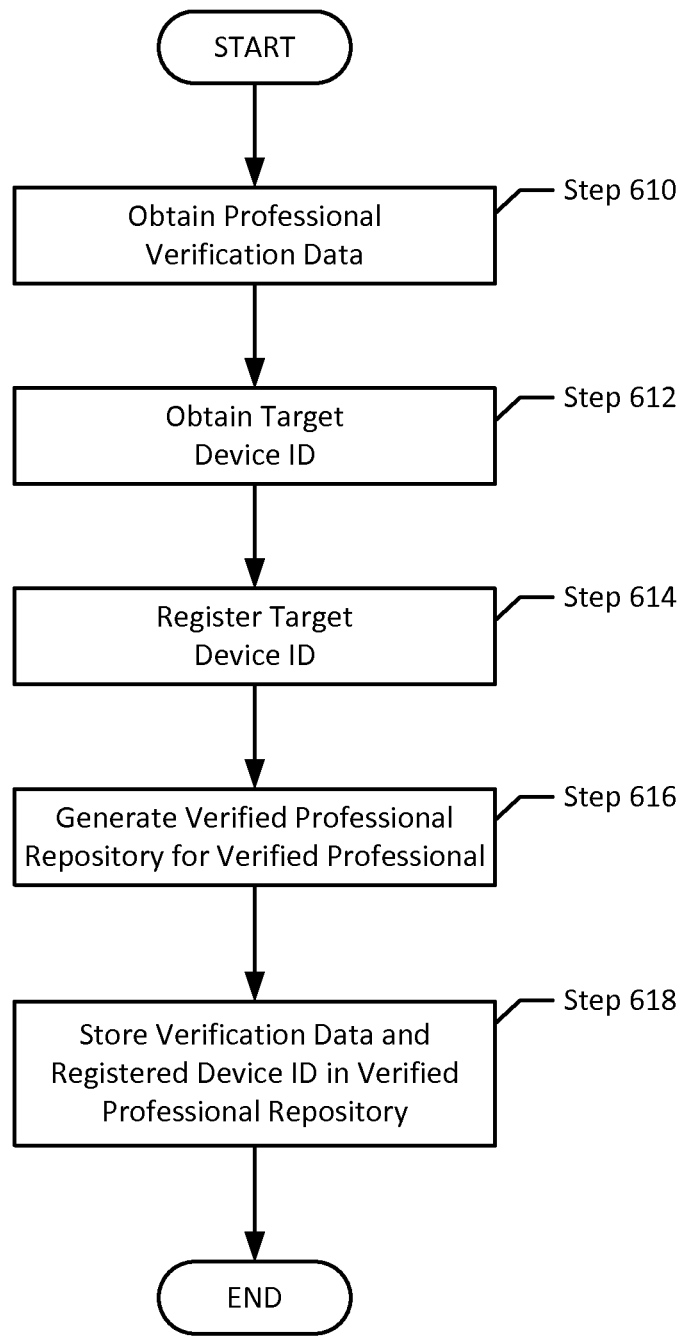
FIG. 6 shows a flowchart in accordance with one or more embodiments of the invention.

FIG. 6 shows a flowchart for verifying a recognized identity in accordance with one or more embodiments of the invention. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 6, may be included in performing this method. Accordingly, the specific arrangement of steps shown in FIG. 6 should not be construed as limiting the scope of the invention.

At Step 610, the verification module of obtains professional verification data. In one embodiment of the invention, professional verification data is data received by the verification module which verifies the identity of the professional. The professional verification data may also include data used to verify the credential of the professional. The type of document or data may vary from professional to professional. For example, for a doctor the verification data might include a government-issued photo identification card to verify the identity, and a copy of the individuals medical degree to verify the credentials. For a celebrity, professional verification data may include a letter from the individual's management company and an affidavit by one or more related individuals attesting to the individuals identity.

At Step 612, the verification module obtains the target device ID. In one embodiment of the invention, the target device ID may be a serial number of a device, a registration code by which the central tracking system identifies the target device, or a phone number of the target device. At Step 614, the target device ID is registered as belonging to the verified professional, and the target device becomes the communication device registered to that verified professional.

In one embodiment of the invention, the target device ID may identify a device previously registered by the central tracking system for use on the telecommunication system. In one embodiment of the invention, once the verification process begins, the central tracking system will obtain the device and register the device with the telecommunication system for use on the network. Once the target device is registered with the telecommunication system, the central tracking system the target device ID may then be registered within the central tracking system as belonging to the verified professional.

At Step 616, the verification module generates a VPR for the verified professional. In one embodiment of the invention, if the verified professional was previously associated with a VPR, then some of the information from the previous VPR may be incorporated into the new VPR. At Step 618, the verification data and the registered device ID are stored in the new VPR.

In one embodiment of the invention, the system may be used by a subscriber to transfer monetary funds directly from the subscriber's account into the account of a verified professional. In the case of a direct monetary transfer, the verification of an identity is performed after a subscriber has initiated a request to transfer funds.

Figure 7A:
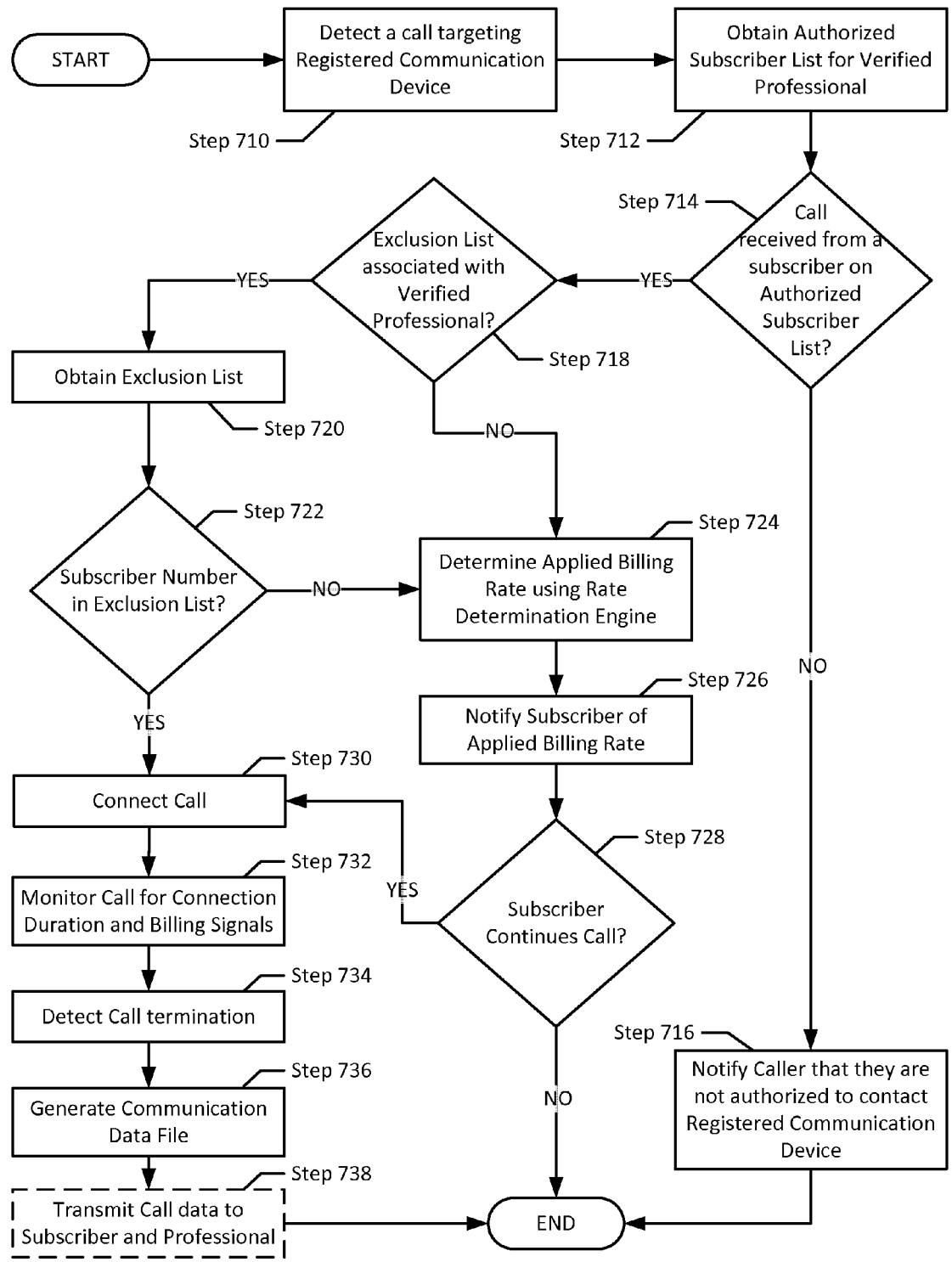
FIGS. 7A and 7B show flowcharts in accordance with one or more embodiments of the invention.

FIG. 7A shows a flowchart for initiating a call between a subscriber and a verified professional in accordance with one or more embodiments of the invention. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 7A, may be included in performing this method. Accordingly, the specific arrangement of steps shown in FIG. 7A should not be construed as limiting the scope of the invention.

At Step 710, the central tracking system detects that a subscriber has initiated a call targeting a communication device registered to a verified professional. The central tracking system may detect the call by receiving the call before the call is connected to communication device registered to a verified professional. In one embodiment of the invention, the central tracking system detects the call via a message sent from the subscriber tracking system or the professional tracking system.

At Step 712, the access engine obtains the authorized subscriber list from the targeted verified professional's VPR. At Step 714, the access engine determines whether the subscriber initiating the communication is authorized to do so using the authorized subscriber list. If the subscriber is not authorized to initiate a communication with the verified professional, then at Step 716, the subscriber is notified that they are not authorized to contact the verified professional, and the communication is terminated.

If at Step 714, the subscriber is authorized to initiate a communication, then at Step 718, a determination is made as to whether an exclusion list is associated with the communication device registered to the verified professional. The determination may be made by central tracking system (e.g. in response to receiving the subscriber number) by obtaining the VPR associated with the registered device ID of the targeted communication device, and determining whether there is an exclusion list associated with the obtained VPR. The determination may also be made by the professional tracking system on the target device, if there is an exclusion list copy in the professional tracking system.

If there is an exclusion list in the VPR or on the professional tracking system, then at Step 720, the exclusion list is obtained. At Step 722, the central tracking system or the professional tracking system determines whether the subscriber who initiated the communication is using a subscriber device that is listed on the exclusion list.

If at Step 718, there is not an exclusion list in the VPR or on the professional tracking system, or if at Step 722, the central tracking system or the professional tracking system determines that the subscriber device is not on the exclusion list, then at Step 724, the applied billing rate is calculated using the rate determination engine. In one embodiment of the invention, the applied billing rate is calculated by the central tracking system using the rate determination engine in the VPR. In one embodiment of the invention, the applied billing rate is calculated by the professional tracking system using the rate determination engine copy.

In one or more embodiments of the invention, the professional is given an opportunity to enter in an applied billing rate after the call is initiated but prior to the call being connected. Specifically, a professional may be notified of an incoming call by a subscriber either known or unknown to the professional. The professional may then be given the opportunity to enter in an applied billing rate for the call, which will then be transmitted to the subscriber. In one or more embodiments of the invention, the applied billing rate may be entered into the device using a number pad on the device.

At Step 726, the subscriber is notified of the applied billing rate via the professional tracking system. In one embodiment of the invention, the notification is generated in response to the professional tracking system receiving a message from the central tracking system. In one embodiment of the invention, the subscriber is notified of the applied billing rate via an audio message over the phone.

In one embodiment of the invention, additional information is provided to the subscriber along with the applied billing rate. Such additional information may include limitations applied to the call. For example, a subscriber may be notified that the applied billing rate is $8.00 per minute, and is not to exceed ten minutes or $80.00. In one embodiment of the invention, the subscriber may be offered different applied billing rate options from which the subscriber may select. For example, the subscriber may be offered a flat fee for a call instead of a per-minute charge, or a discount for agreeing to a longer call duration up front (e.g., $8.00 per minute or $60.00 for ten minutes).

At Step 728, the central tracking system determines whether the subscriber would like to continue the call after being informed of the applied billing rate. In one embodiment of the invention, the professional tracking system presents the subscriber with a prompt asking whether the subscriber would like to continue. In one embodiment of the invention, a subscriber responds to the notification by pressing a key on the number pad of the phone (e.g., pressing "7" indicates acceptance of the charges, pressing "3" indicates that the subscriber does not wish to continue). If the subscriber chooses not to continue, then the process ends.

If at Step 722, the central tracking system or the professional tracking system determines that the subscriber device is on the exclusion list, or if at Step 728 the central tracking system determines that the subscriber would like to continue the call, then at Step 730, the central tracking system initiates the call connection. At Step 732, the central tracking system monitors the call to obtain the communication duration and any billing signals generated during the call. In one embodiment of the invention, the call is monitored using messages sent to the central tracking system from the professional tracking system. The central tracking system also creates a recording of the call, either directly or via the professional tracking system. At Step 734, the central tracking system detects that the call has been terminated. At Step 736, the central tracking system generates a CDF for the terminated call using the subscriber device ID, the communication duration, the registered device ID, any billing signals detected, and the recording of the communication. Optionally at Step 738, the central tracking system transmits data about the call to the subscriber and/or the verified professional. In one embodiment of the invention, the data is presented via the visual alert mechanism or the audio alert mechanism in the professional tracking system.

Figure 7B:
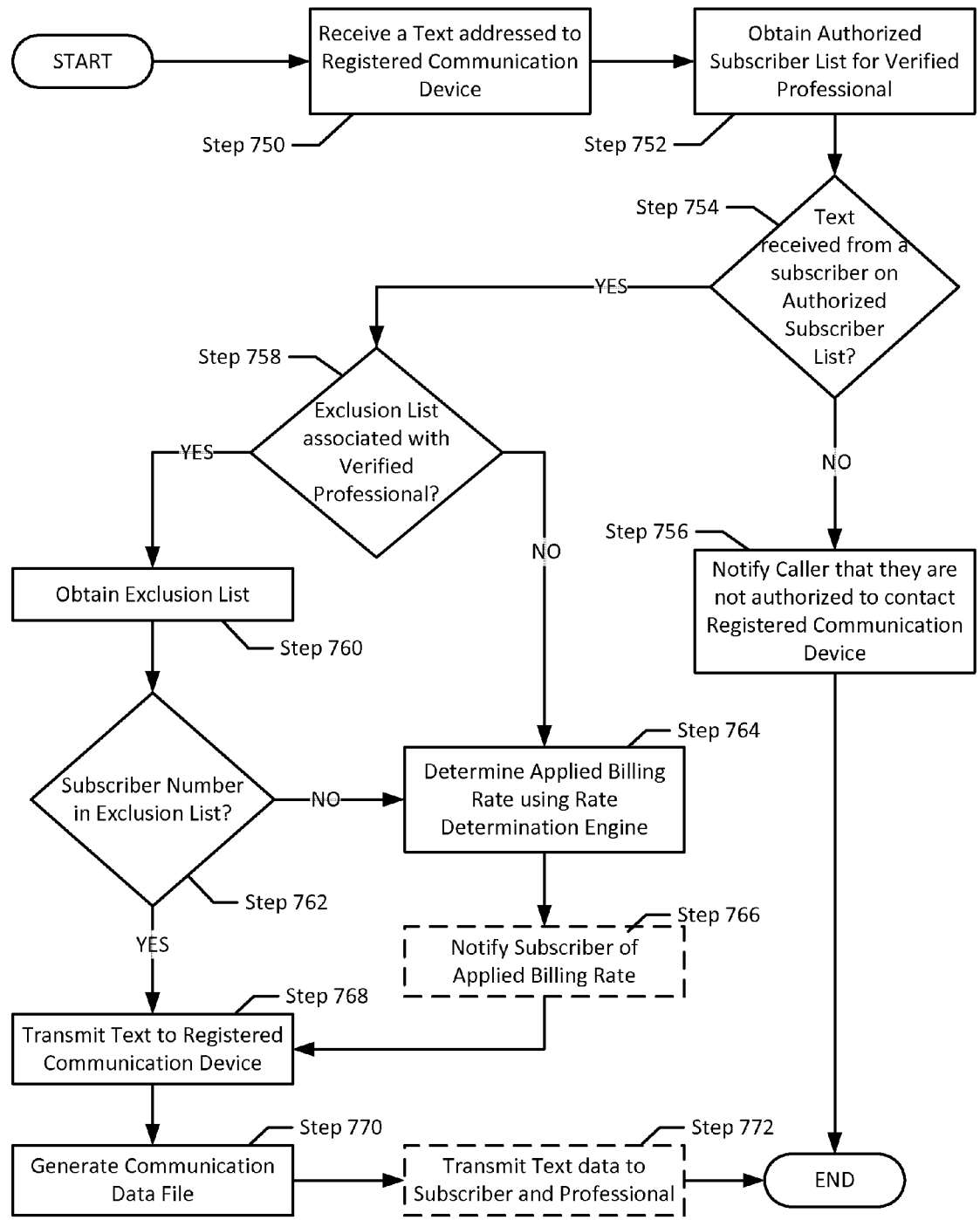

FIG. 7B shows a flowchart for initiating a text communication in accordance with one or more embodiments of the invention. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 7B, may be included in performing this method. Accordingly, the specific arrangement of steps shown in FIG. 7B should not be construed as limiting the scope of the invention.

At Step 750, the central tracking system detects that a subscriber has sent a text targeting a communication device registered to a verified professional. The central tracking system may detect the text by receiving the text before the text is transmitted to communication device registered to a verified professional. In one embodiment of the invention, the central tracking system is notified of the text by the subscriber tracking system or the professional tracking system.

At Step 752, the access engine obtains the authorized subscriber list from the targeted verified professional's VPR. At Step 754, the access engine determines whether the subscriber initiating the text communication is authorized to do so using the authorized subscriber list. If the subscriber is not authorized to initiate a text communication with the verified professional, then at Step 756, the subscriber is notified that they are not authorized to contact the verified professional, and the communication is terminated.

If at Step 754, the subscriber is authorized to initiate a communication, then at Step 758, a determination is made as to whether an exclusion list is associated with the communication device registered to the verified professional. The determination may be made by central tracking system (e.g. in response to receiving the subscriber number) by obtaining the VPR associated with the registered device ID of the targeted communication device, and determining whether there is an exclusion list associated with the obtained VPR. The determination may also be made by the professional tracking system on the target device, if there is an exclusion list copy in the professional tracking system.

If there is an exclusion list in the VPR or on the professional tracking system, then at Step 760, the exclusion list is obtained. At Step 762, t the central tracking system or the professional tracking system determines whether the subscriber who initiated the text is using a subscriber device that is listed on the exclusion list.

If at Step 758, there is not an exclusion list in the VPR or on the professional tracking system, or if at Step 762, the central tracking system or the professional tracking system determines that the subscriber device is not on the exclusion list, then at Step 764, the applied billing rate is calculated using the rate determination engine. In one embodiment of the invention, the applied billing rate is calculated by the central tracking system using the rate determination engine in the VPR. In one embodiment of the invention, the applied billing rate is calculated by the professional tracking system using the rate determination engine copy. Optionally at Step 766, the central tracking system may notify the sender of the cost associated with transmitting the text to the verified professional.

If at Step 762, the central tracking system or the professional tracking system determines that the subscriber device is not on the exclusion list, or if the applied billing rate has been determined, then at Step 768, the central tracking system sends the text message to the communication device registered to the verified professional. At Step 770, the central tracking system generates a CDF for the text transmission using the subscriber device ID, the communication duration (e.g., size of the text message or number of text messages), the registered device ID, and the copy of the text communication. This information may be received from the subscriber tracking system or the professional tracking system. Optionally at Step 772, the central tracking system transmits data about the text to the subscriber and/or the verified professional.

In one embodiment of the invention, a communication request is a request to initiate a direct monetary transfer, and may include a transfer amount the subscriber is requesting be transferred. In the case of a direct monetary transfer, the process may differ from the processes described above in regard to FIGS. 7A and 7B. In one embodiment of the invention, the communication request for a monetary transfer may trigger the verification process in the verification module if the target of the direct monetary transfer communication is not a verified professional. Further, in one embodiment of the invention, the subscriber sending the communication request for a direct monetary transfer may be notified of the portion of the communication charge that the verified professional will receive.

Figure 8:
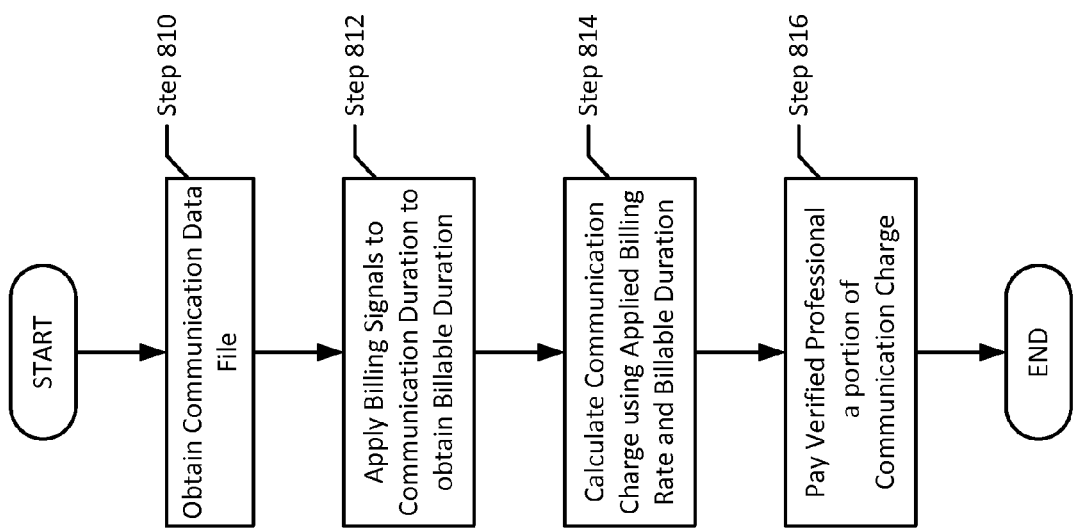
FIG. 8 shows a flowchart in accordance with one or more embodiments of the invention.

FIG. 8 shows a flowchart for generating a communication bill in accordance with one or more embodiments of the invention. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 8, may be included in performing this method. Accordingly, the specific arrangement of steps shown in FIG. 8 should not be construed as limiting the scope of the invention.

At Step 810, the billing module obtains a CDF from the CDF repository within the VPR of a verified professional. At Step 812, the billing module applies any billing signals detected to the communication duration to obtain a billable duration. At Step 814, the billing module uses the billable duration and the applied billing rate to calculate a communication charge. At Step 816, the billing module uses the deposit account information in the VPR to issue a payment to the verified professional in an amount equal to a portion of the communication charge.

In one embodiment of the invention, the central tracking system may receive a request for a direct monetary transfer from a subscriber to an unverified identity. The central tracking system, upon receiving a request for a direct monetary transfer, may then generate a direct monetary transfer CDF. Once the direct monetary transfer CDF has been generated, the central tracking system may then initiate the verification procedure for the identity before proceeding with payment as described above.

Figure 9A:
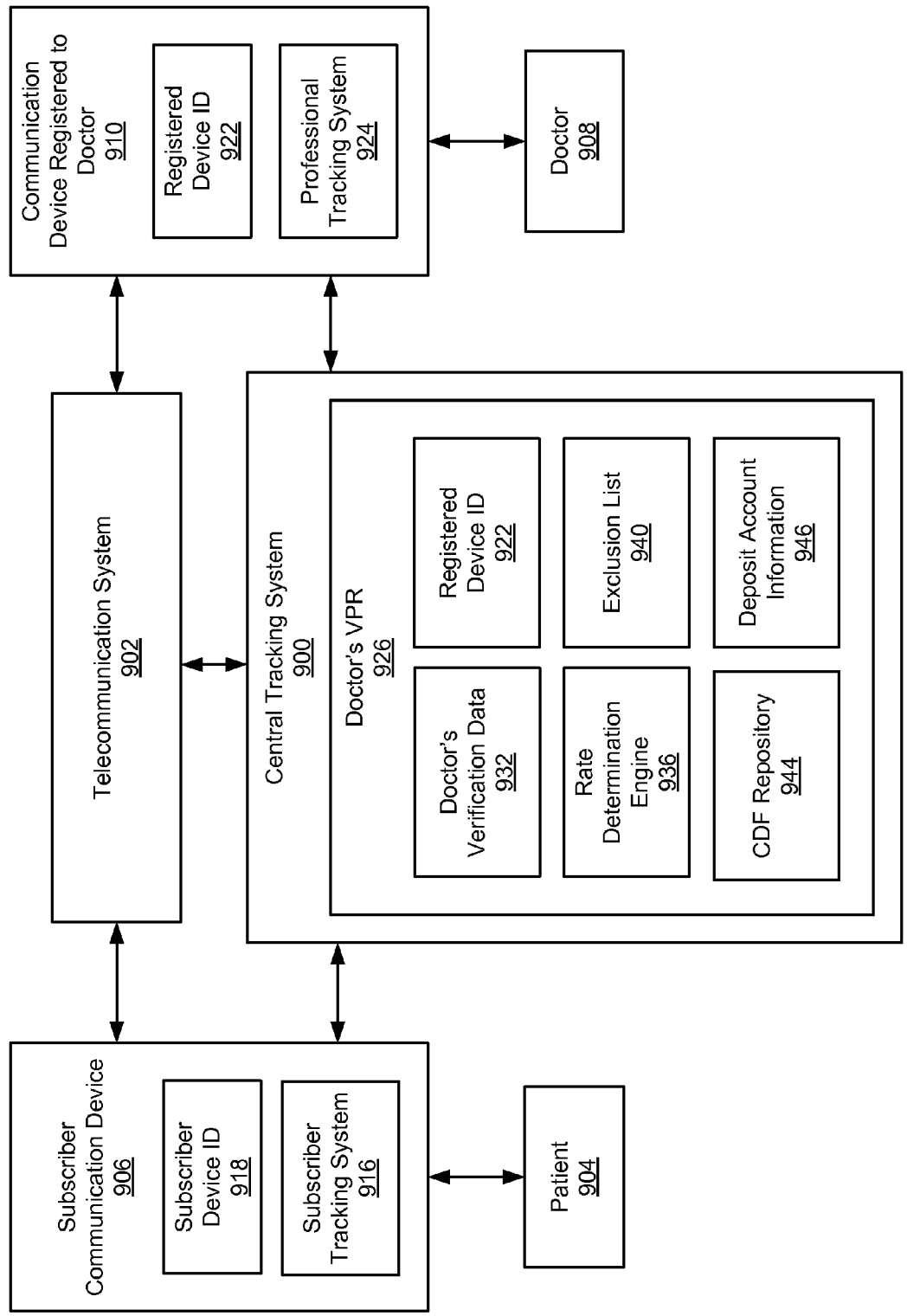
FIGS. 9A-9D show an example in accordance with one or more embodiments of the invention.
Figure 9B:
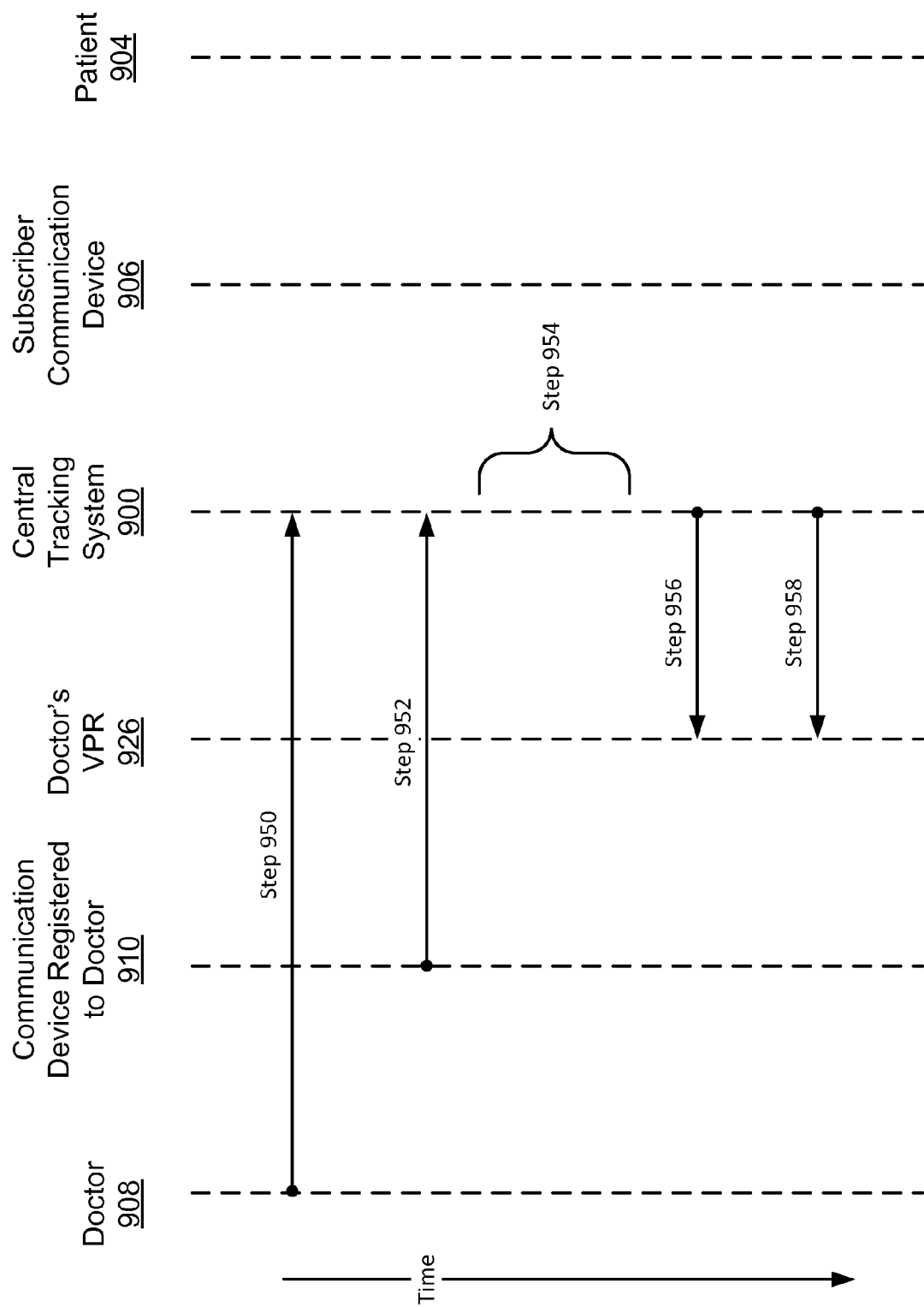

FIGS. 9A and 9B show an exemplary system and timeline in accordance with one embodiment of the invention. Specifically, FIGS. 9A and 9B depict an embodiment of the invention in which a doctor is verified as a verified professional, receives a communication, and a bill for the communication is generated.

As shown in FIG. 9A, the system includes patient (904) using a subscriber communication device (906) with a subscriber device ID (918) and a subscriber tracking system (916). The subscriber communication device (906) is registered with central tracking system (900) using the subscriber device ID (918) and communicates via the telecommunication system (902) and the central tracking system (900). The system also includes a doctor (908) using a communication device registered to the doctor (910). The communication device registered to the doctor (910) includes a professional tracking system (924) and a registered device ID (922). The communication device registered to the doctor (910) is registered with the central tracking system (900) using the registered device ID (922) and communicates with the telecommunication system (902) and the central tracking system (900).

The central tracking system (900) includes the doctor's VPR (926). The doctor's VPR (926) includes the doctor's verification data (932), the registered device ID (922), a rate determination engine (936), an exclusion list (940), a CDF repository (944), and deposit account information (946).

FIG. 9B shows a timeline of an exemplary interaction between the elements in FIG. 9A. Specifically, FIG. 9B shows a timeline for verifying the doctor. At Step 950, the central tracking system (900) obtains professional verification data from the doctor (908). For the purposes of the example, assume that the central tracking system (900) has obtained a copy of the doctor's driver's license and a copy of her medical degree. At Step 952, the central tracking system (900) obtains the device ID of the doctor's smartphone that she wants to register. At Step 954, the smartphone device ID is registered as belonging to the doctor, and the smartphone becomes the communication device registered to the doctor (908). At Step 956, the central tracking system (900) generates the VPR (926) for the doctor (908). At Step 958, the verification data (932) and the smartphone device ID (922) are stored in the doctor's VPR (926).

Figure 9C:
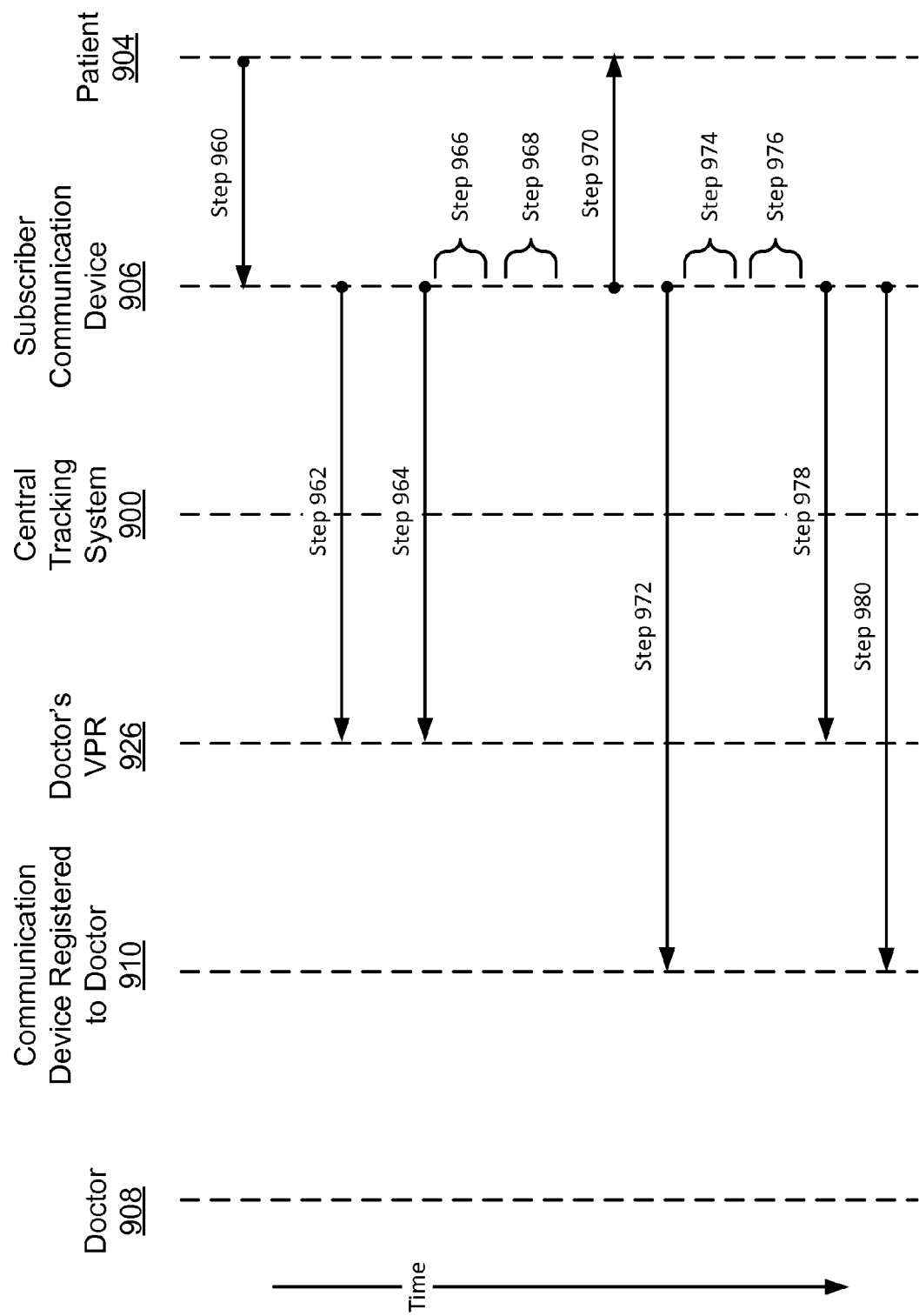

FIG. 9C shows a timeline of an exemplary interaction between the elements in FIG. 9A. Specifically, FIG. 9C shows a timeline for initiating a call between the doctor and the patient.

At Step 960, the central tracking system (900) detects a call initiated from patient (904) targeting the doctor's smartphone (910). At Step 962, the central tracking system (900) obtains the doctor's VPR (926) using the smartphone device ID (922), and determines that there is an exclusion list (940) associated with the VPR (926). At Step 964, the central tracking system (900) obtains the exclusion list (940). At Step 966, the central tracking system (900) determines that the patient's subscriber device ID (918) is not on the exclusion list (940).

At Step 968, the central tracking system (900) uses the rate determination engine (936) to determine an applied billing rate for the call. At Step 970, the central tracking system (900) notifies the patient of the applied billing rate by initiating, via the subscriber tracking system (916), an audio message stating that the patient will be charged $5.99 a minute for the call. At Step 972, the subscriber tracking system (916) generates a prompt asking the patent if they would like to continue the call, which the patient answers affirmatively. Also at Step 972, the subscriber tracking system (916) transmits the response to the central tracking system (900) and the connects the call. At Step 974, the central tracking system (900) monitors the call and obtains the call duration of eleven minutes and a billing signal from the professional tracking system (924) indicating that the patent should not be charged for the last minute of the call. Also at Step 974, the central tracking system (900) creates a recording of the call. At Step 976, the central tracking system (900) detects that the call has been terminated, and generates a CDF for the terminated call using the patient's subscriber device ID (918), the duration of the call, the doctor's smartphone device ID (922), the billing signal, and the recording. At Step 978, the central tracking system (900) stores the CDF in the CDF repository (944) in the doctor's VPR (926). At Step 980, the central tracking system (900) transmits data about the call to the professional tracking system (924) on the doctor's smartphone (910).

Figure 9D:
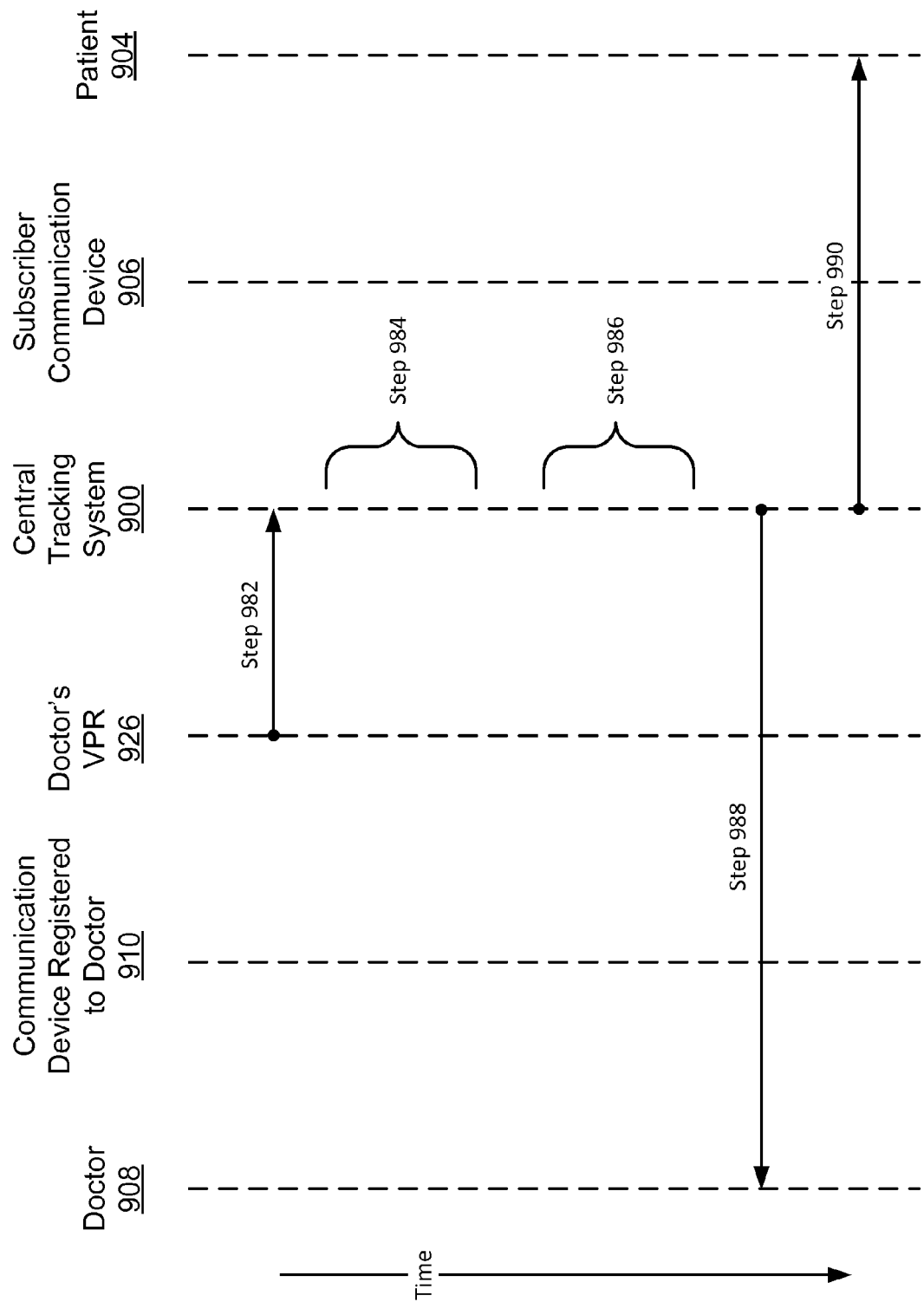

FIG. 9D shows a timeline of an exemplary interaction between the elements in FIG. 9A. Specifically, FIG. 9D shows a timeline for verifying the doctor, initiating a call between the doctor and the patient, and generating a bill for the call.

At Step 982, the central tracking system (900) obtains the CDF from the CDF repository (944) in the doctor's VPR (926). At Step 984, the central tracking system (900) applies the billing signal to the call duration by subtracting the last minute of the call from the call duration, and obtains the billable duration of ten minutes. At Step 986, the central tracking system (900) uses the billable duration and the applied billing rate to calculate a call charge of $59.90. At Step 988, the central tracking system (900) uses the deposit account information (946) to issue a payment to the doctor for an amount equal to 90% of the communication charge ($53.91). At Step 990, the central tracking system (900) issues an invoice to the patient in the full amount of the call charge of $59.90.

FIGS. 10A-10F show example interfaces for the subscriber tracking system. For the purposes of the example, the subscriber communication device is depicted as a touchscreen smartphone, the subscriber tracking system is depicted as a subscriber application installed on the smartphone, and the central tracking system is implemented using voice-over-internet-protocol (VOIP).

Figure 10B:
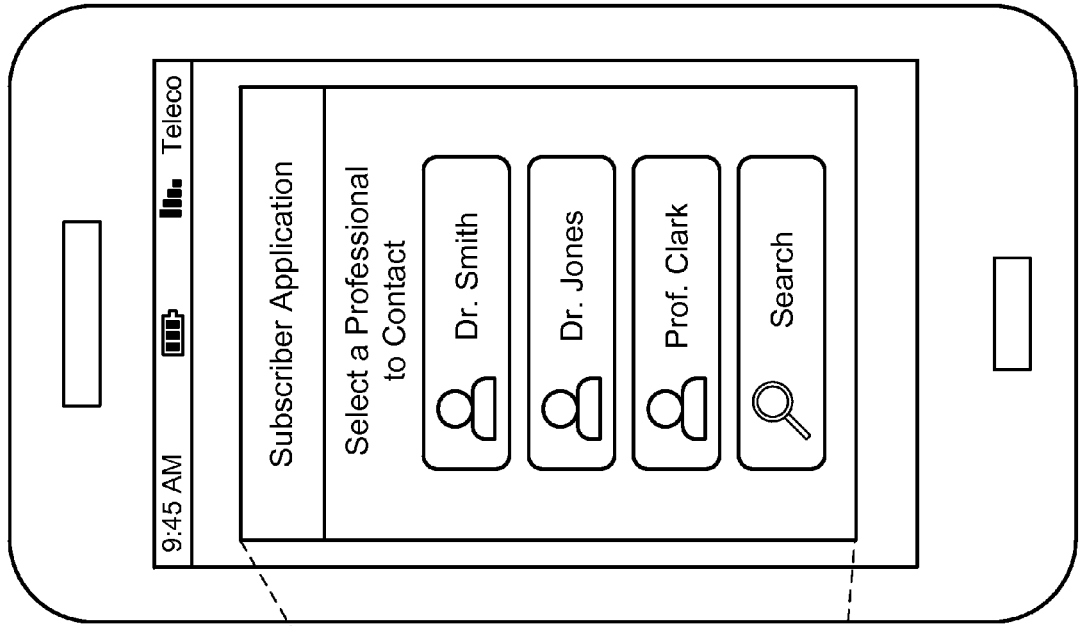
FIGS. 10A-10F show an example in accordance with one or more embodiments of the invention.
Figure 10A:
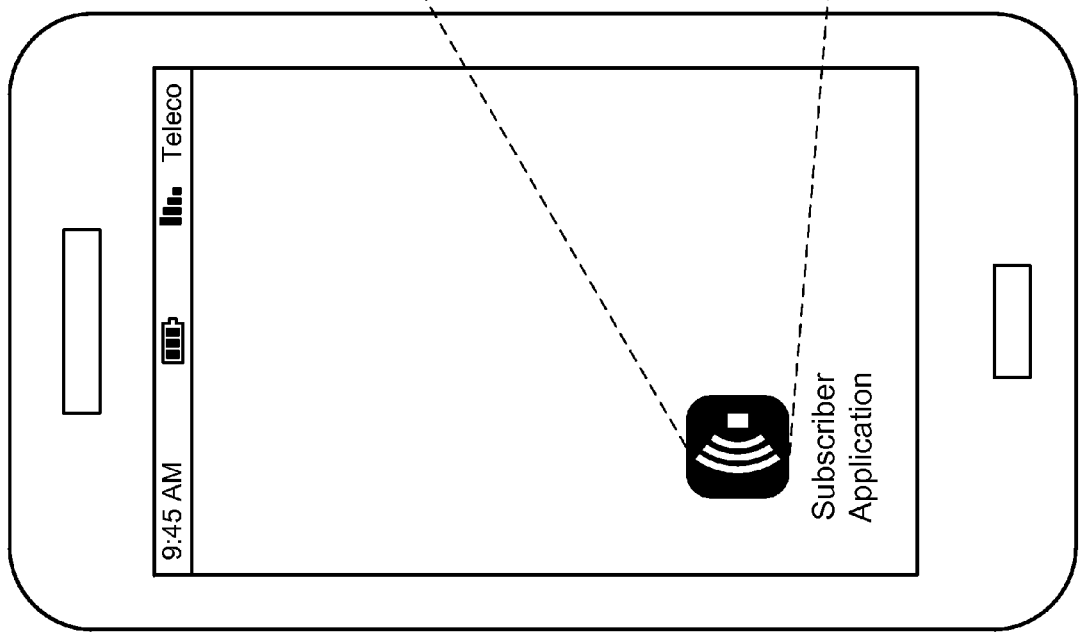

In FIG. 10A, the subscriber launches the subscriber application from the application browser of the subscriber's smartphone. In FIG. 10B, the subscriber is presented with a list of verified professionals. These may be professionals with whom the subscriber has communicated previously. The subscriber is also presented with the option to search for a verified professional. The subscriber is able to search using a name, profession, location, accreditation, or any other searchable criteria or combination of criteria. The query is sent to the central tracking system (via wireless internet connection or cellular data connection), and the results are transmitted back to the subscriber's device.

Although not depicted in FIG. 10B, the subscriber may have access to a communication history. The communication history may include the duration and charges of previous communications. The communication history may also include the ability to retrieve the text of the communication (for a text message) or an audio recording of a previous communication (for a voice calls).

The subscriber may also have access to general account information and settings. This may include a running total of all charges for the current payment period. The subscriber may be able to use this part of the subscriber application to enter or change payment information (such as a Paypal account).

Figure 10D:
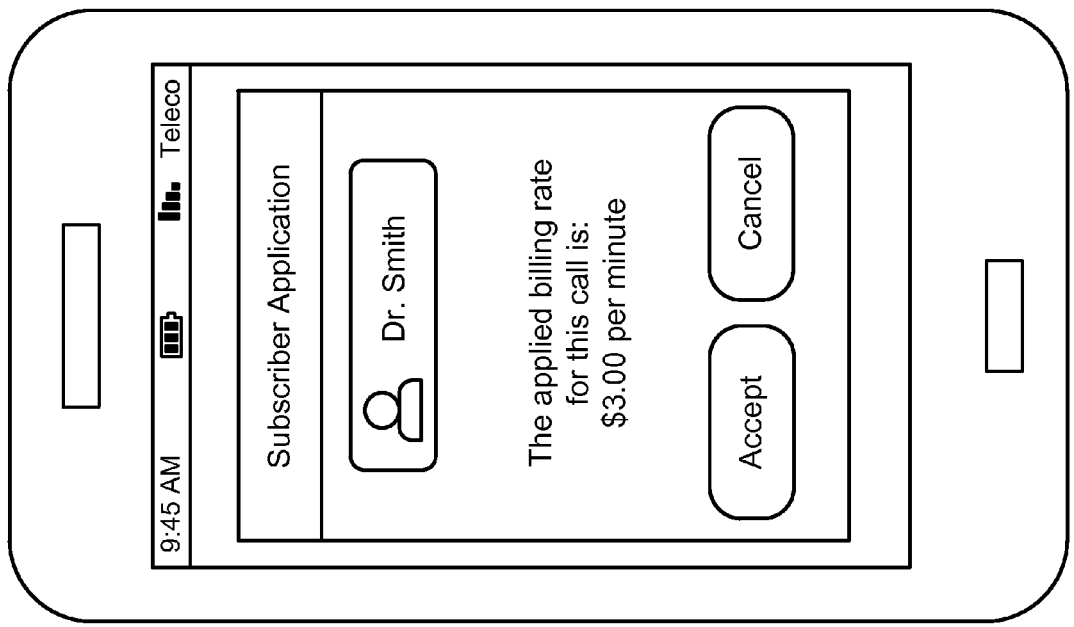
Figure 10C:
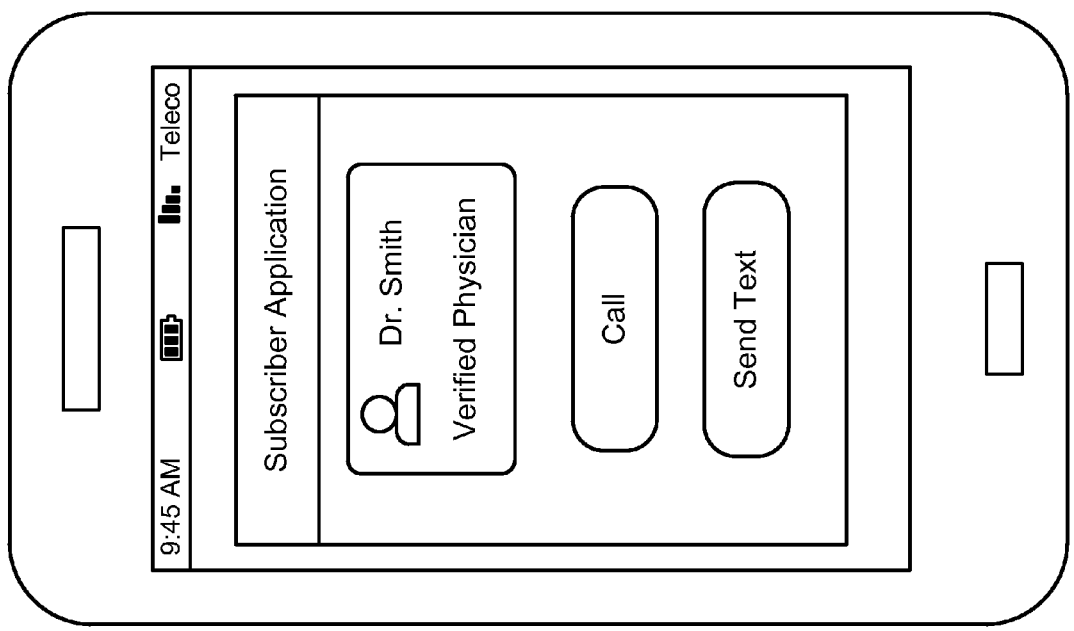

In FIG. 10C, the subscriber has selected Dr. Smith from the options presented in FIG. 10B. The subscriber application presents the subscriber with Dr. Smith's details, such as her credentials. The details about Dr. Smith may also include her current applied billing rate for voice calls, if that information is available to the subscriber application before initiating the communication. Along with Dr. Smith's details, the subscriber is also presented with the option to either initiate a voice call or a text message to Dr. Smith.

In FIG. 10D, the subscriber has selected to initiate a voice call from the options presented in FIG. 10C. Once the subscriber initiates a voice call, the subscriber application notifies the central tracking system. The central tracking system determines that Dr. Smith has an exclusion list, but the subscriber is not on Dr. Smith's exclusion list. The central tracking system then calculates Dr. Smith's current applied billing rate, and transmits that information to the subscriber application. The applied billing rate is then presented to the subscriber, and the subscriber is asked if they want to proceed with the communication.

Figure 10F:
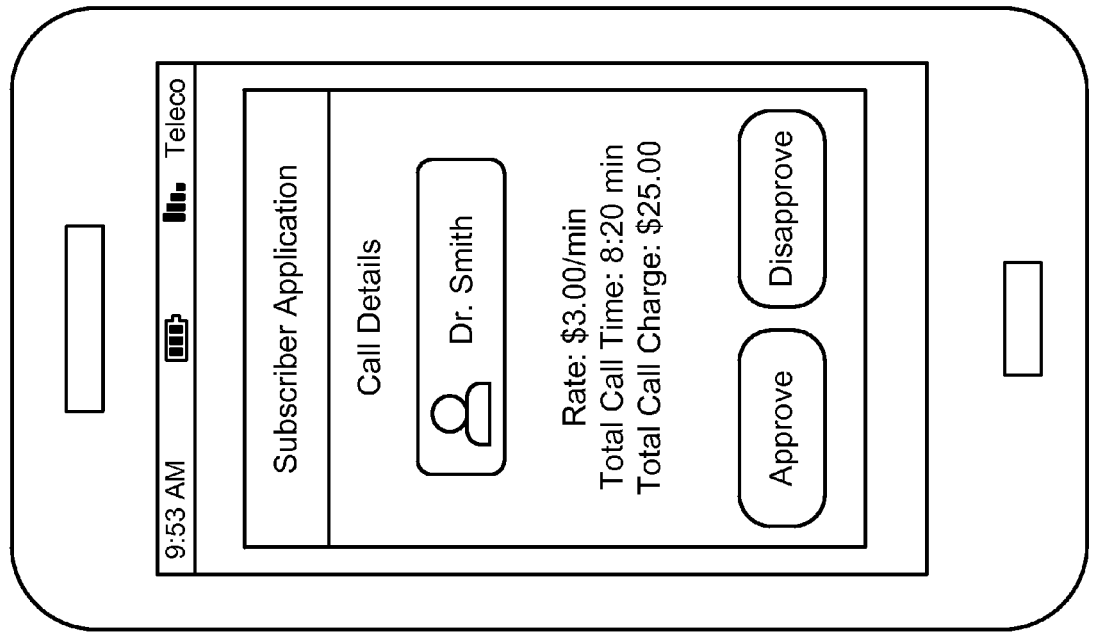
Figure 10E:
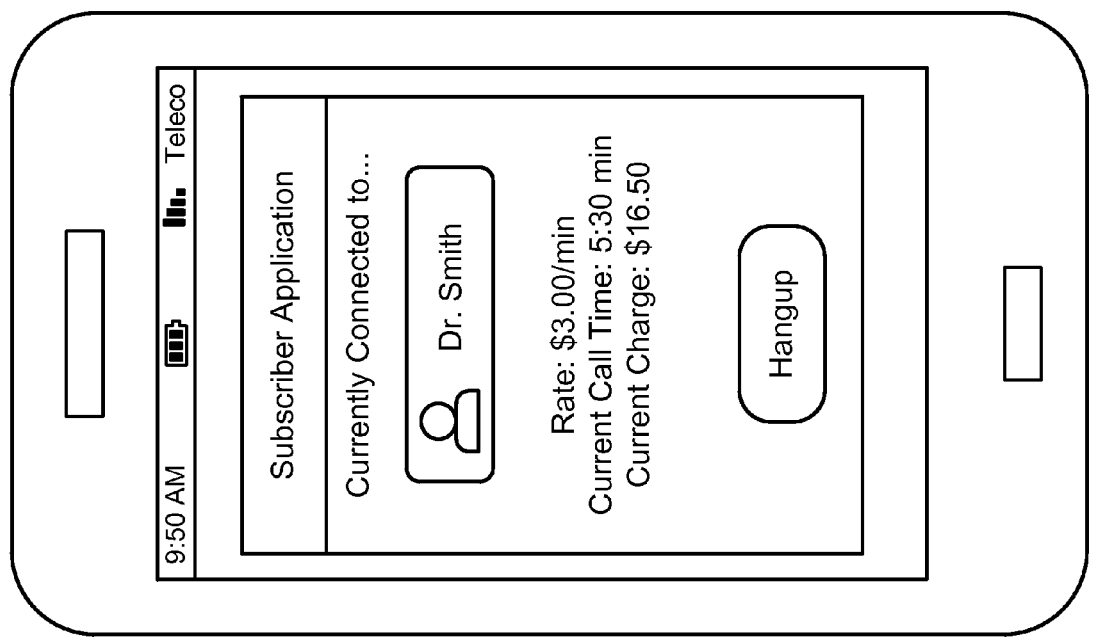

In FIG. 10E, the subscriber has selected to accept the charges from the options presented in FIG. 10D. Once the subscriber accepts the applied billing rate, the central tracking system establishes the VOIP connection between the subscriber and Dr. Smith. The central tracking system monitors the call for billing signals sent by the Dr. Smith. The subscriber application displays the applied billing rate, the current length of the call, and the resulting current charge for the call.

In FIG. 10F, the subscriber has selected to end the call by selecting hangup from the screen presented in FIG. 10E. The subscriber is presented with the call details for the communication, including the applied billing rate, the total call time, and the total charge for the call. These totals may account for any additional charges or reduced charges based on the billing signals sent from Dr. Smith (e.g., during a period of time that Dr. Smith and the subscriber were not discussing a professional matter). These totals may also account for any additional charges based on a recalculation of Dr. Smith's applied billing rate (e.g., if Dr. Smith has an increased applied billing rate for calls after 9:50 am, and a portion of the call takes place after 9:50 am).

Continuing with the description of FIG. 10F, the subscriber is presented with the option to either approve or disapprove the call details. If the subscriber disapproves the call details, the communication data file may be flagged as disputed, and may evaluated by a disputed communication specialist for resolution.

FIGS. 11A-11F show example interfaces for the professional tracking system. For the purposes of the example, the device registered to the verified professional is depicted as a touchscreen smartphone, the professional tracking system is depicted as a professional application installed on the smartphone, and the central tracking system is implemented using a combination of cellular voice communication and VOIP.

Figure 11B:
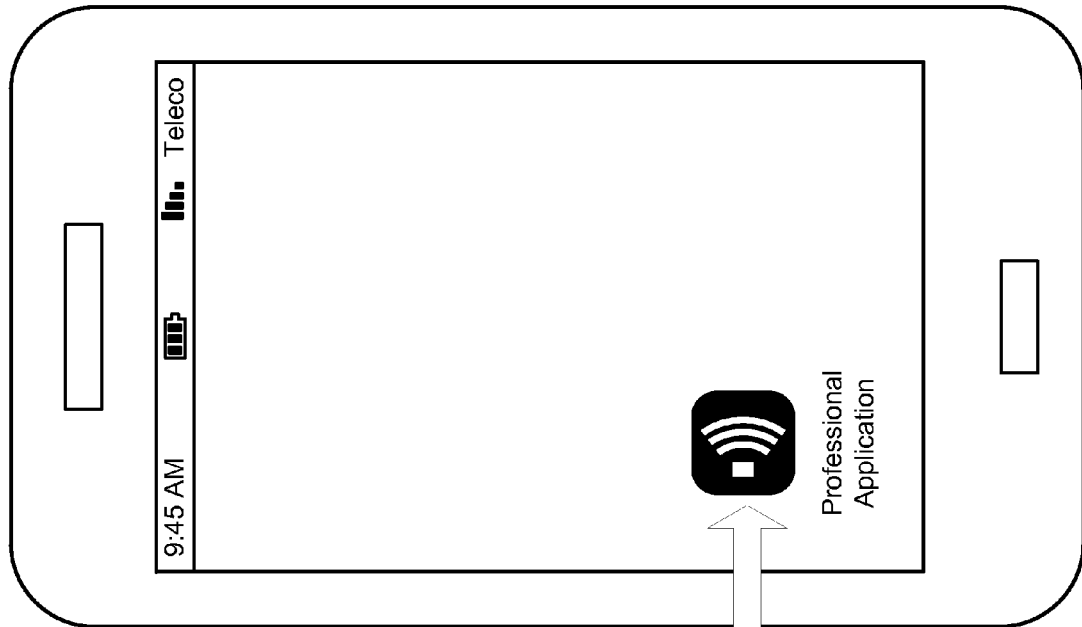
FIGS. 11A-11F show an example in accordance with one or more embodiments of the invention.
Figure 11A:
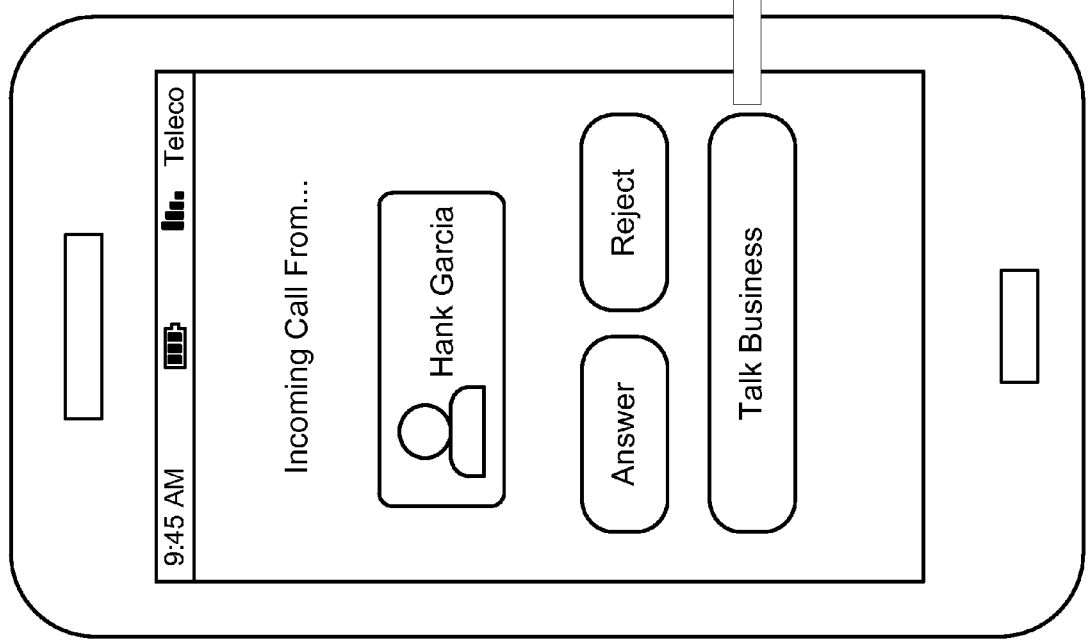

In FIG. 11A, the verified professional receives a voice call from Hank Garcia over the cellular voice network. The professional is presented with the option to answer the call normally, reject the call, or select the talk business option. In the example, the caller is a patient of the professional. The professional recognizes the caller as a patient, and selects the talk business option. Alternatively, the professional could select answer, and the call would be answered as a call from a non-subscriber. In the event that the professional selects answer, the talk business option would remain available on the screen.

Alternatively, the device registered to the verified professional may automatically launch the professional application upon receiving the call from Hank Garcia. This may be done if the device is configured to trigger the professional application when an incoming call meets certain criteria. For example, the device may be configured with two incoming lines. The device may detect that an incoming call is on a line designated as a professional line, and in response, launches the professional application to receive the call.

In FIG. 11B, the professional has selected the talk business option, either before accepting the call or during an initial conversation with Hank Garcia. Selecting the talk business button launches the professional application. In FIG. 11C, the professional application launches. The call may be initiated or continue over the cellular voice network. Alternatively, Hank Garcia's call may be routed to the VOIP system, which will connect the call between Hank Garcia and the professional. From that point forward, the call will take place using VOIP data sent between Hank Garcia's device and the device registered to the verified professional.

Figure 11D:
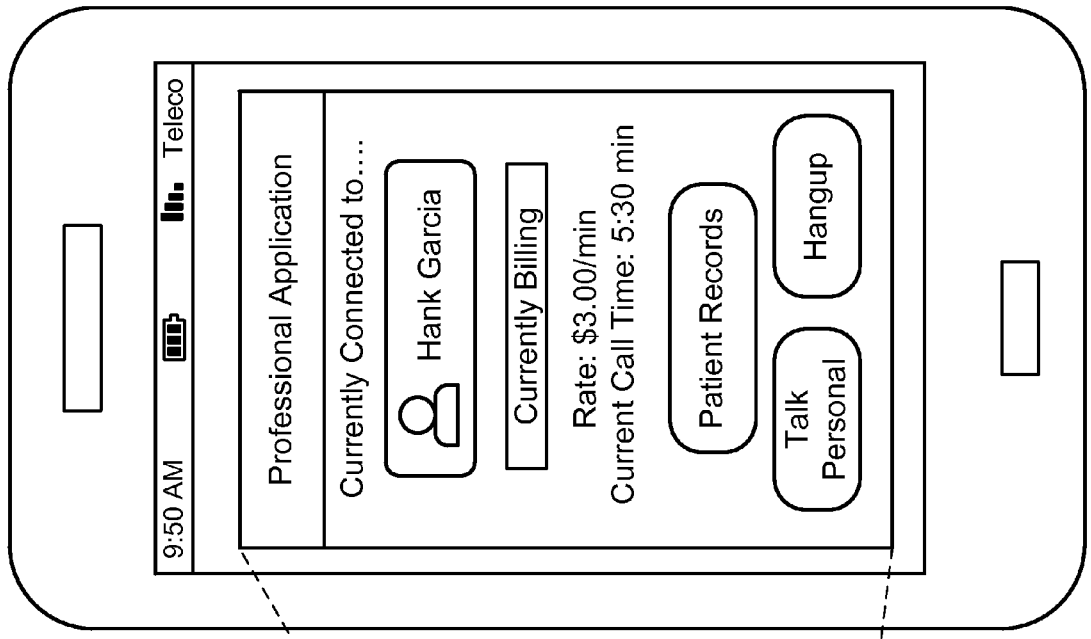
Figure 11C:
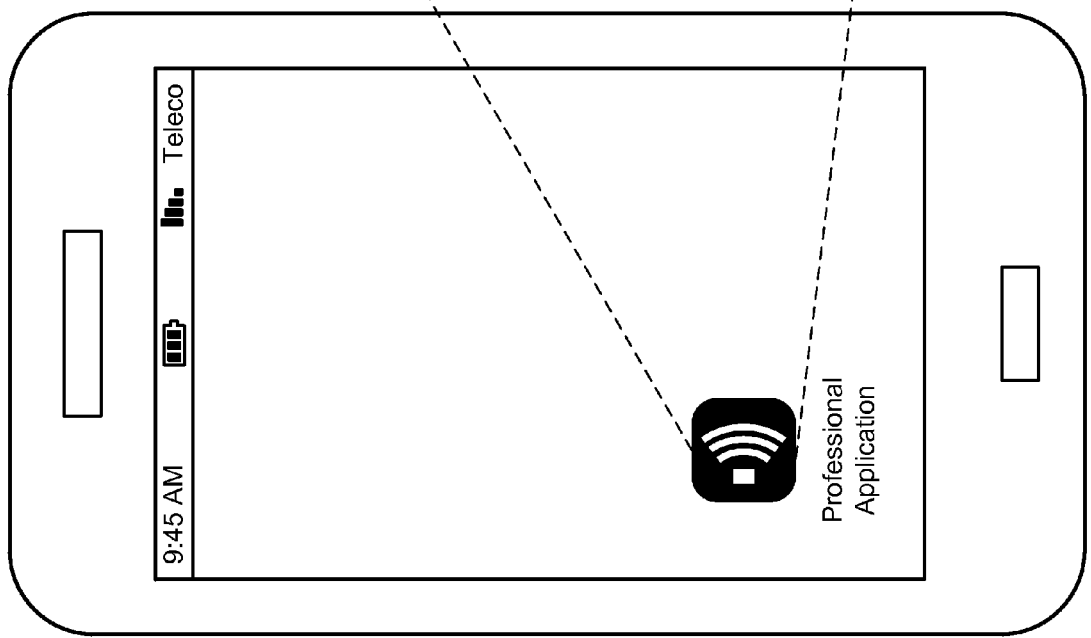

In FIG. 11D, the call has been routed to the VOIP system. The professional is presented with Hank Garcia's photo (if available), the applied billing rate that Hank has accepted, and the current call time. The professional application also presents a notification to the professional that Hank Garcia is currently being billed for the call. The professional application has detected that Hank Garcia's patient record is available, and the professional is presented with the option of reading Hank Garcia's patient records. The patient records may be stored by the central tracking system or the professional's own local or remote database. The professional is also presented with the option to talk personal or end the call by selecting the hangup option.

Figure 11F:
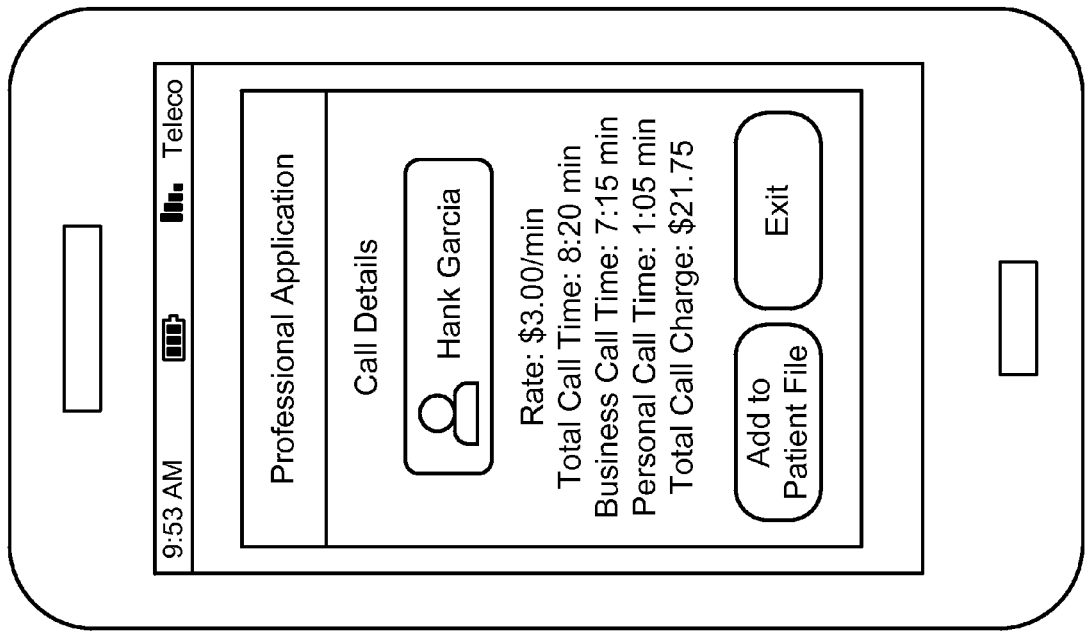
Figure 11E:
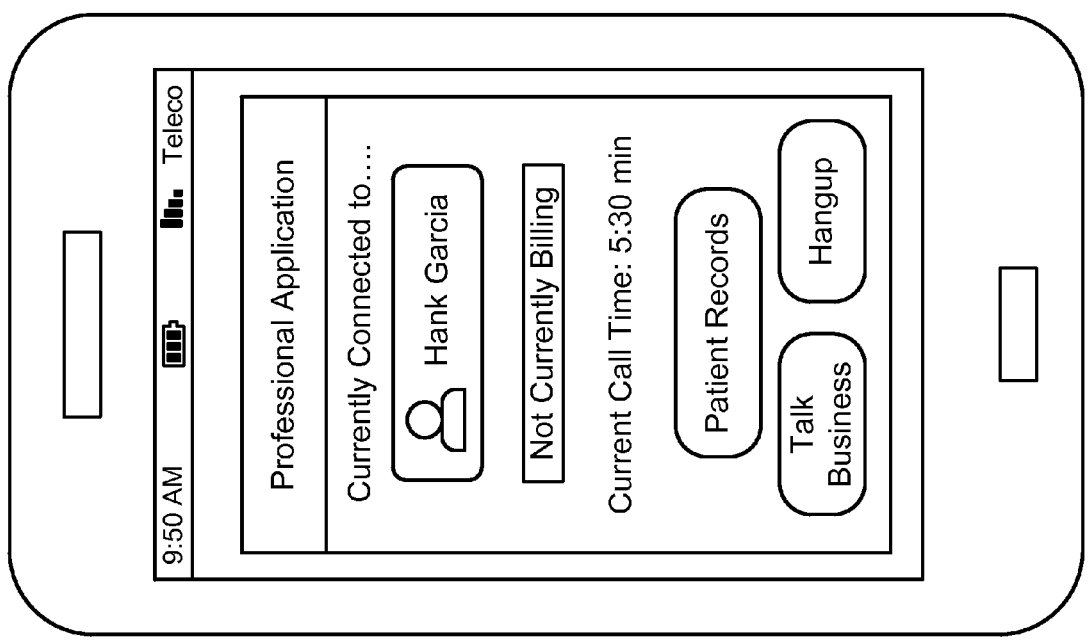

In FIG. 11E, the professional has selected to talk personal from the screen presented in FIG. 11D. Selecting the talk personal option generates a billing signal that is sent to the central tracking system. The billing signal indicates that Hank Garcia should not be charged for the portion of the call beginning at the point when the talk personal option is selected. The professional is presented with the current call time, and a notification that Hank Garcia is not currently being billed for the call. The professional is presented with a talk business option. Selecting the talk business option would generate a second billing signal indicating that Hank Garcia should be charged for the portion of the call beginning at the point when the talk business option is selected. The professional would, in that case, be presented once again with the screen presented in FIG. 11D.

In FIG. 11F, the professional has selected to end the call by selecting hangup from the screen presented in FIG. 11E. The professional is presented with the call details for the communication, including the applied billing rate, the total call time, the total business call time, the total personal call time, and the total charge for the call.

Continuing with the description of FIG. 11F, the professional is presented with the option of adding the call information to Hank Garcia's patient record or to exit the information screen. Although not shown, the professional may also be presented with the option of canceling the entire charge for the call, or adjusting the charge as the professional sees fit.

In addition, the professional application may also include an option to view or change the professional's general account settings. Using the general account settings, the professional is able to change the professional's applied billing rate, add or remove subscribers from the professional's exclusion list, or set a schedule during which the professional will be unavailable to receive calls. The professional may also be able to add or edit the deposit account information where payment to the professional is made.

The professional may also be able to access the communication history for their account. The account history may include details from previous communications, access to recordings of previous communications, and total earned amounts in the current payment period or a previous payment period. The communication history may also present the professional with the option to change or delete a previously stored communication file.

Figure 12:
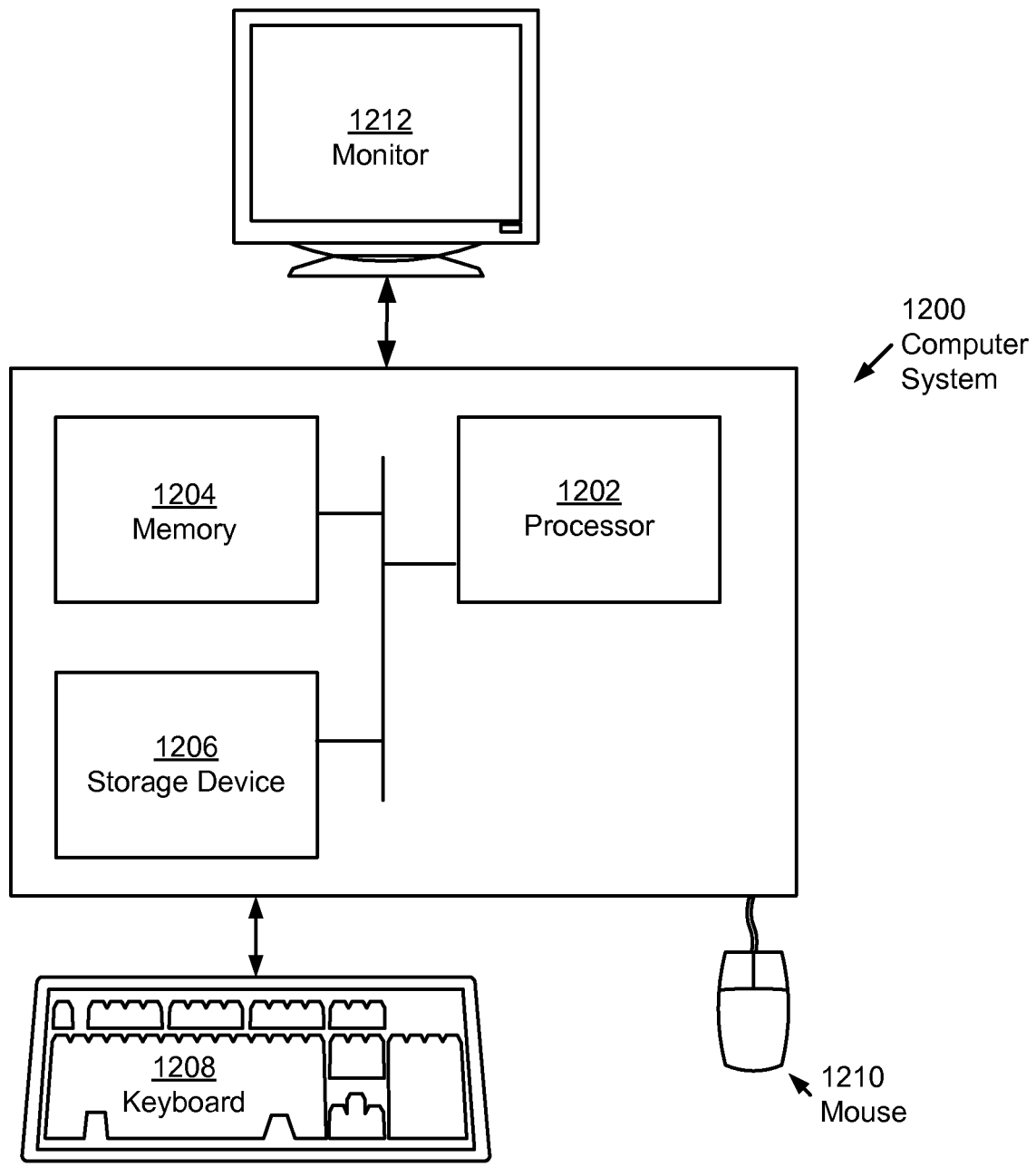
FIG. 12 shows a computer system in accordance with one or more embodiments of the invention.

Embodiments of the invention may be implemented on virtually any type of computer regardless of the platform being used. For example, as shown in FIG. 12, a computer system (1200) includes one or more processor(s) (1202), associated memory (1204) (e.g., random access memory (RAM), cache memory, flash memory, etc.), a storage device (1206) (e.g., a hard disk, an optical drive such as a compact disk drive or digital video disk (DVD) drive, a flash memory stick, etc.), and numerous other elements and functionalities typical of today's computers (not shown). The computer (1200) may also include input means, such as a keyboard (1208), a mouse (1210), or a microphone (not shown). Further, the computer (1200) may include output means, such as a monitor (1212) (e.g., a liquid crystal display (LCD), a plasma display, or cathode ray tube (CRT) monitor). The computer system (1200) may be connected to a network (not shown) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (1200) includes at least the minimal processing, input, and/or output means necessary to practice embodiments of the invention.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A system to bill communications between a subscriber and a verified professional comprising:
   a server;
   a verification module executing on the server and configured to verify that the verified professional matches an individual sought by the subscriber, by:
      obtaining a plurality of verification data for the verified professional,
      verifying, based on the plurality of verification data, at least one selected from a group consisting of an identity of the verified professional and a credential of the verified professional to generate a verified professional repository that matches the individual, and
      storing, in the verified professional repository, the plurality of verification data and a registered device identification (ID) associated with a communication device used by the verified professional; and
   a central tracking system executing on the server and configured to:
      receive a communication request targeting the registered device ID from a subscriber communication device associated with a subscriber ID,
      determine an applied billing rate using a value set by the verified professional,
      transmit the applied billing rate to the subscriber communication device,
      initiate a connection between the subscriber communication device and the communication device used by the verified professional,
      track the connection to obtain a communication duration and a billing signal,
      initiate a termination of the connection between the subscriber communication device and the communication device used by the verified professional,
      generate a communication data file comprising the registered device ID, the subscriber ID, the applied billing rate, the communication duration, and the billing signal,
      obtain a billable duration by parsing the communication data file using the billing signal and the communication duration,
      calculate a communication charge using the applied billing rate and billable duration, and
      pay the verified professional a portion of the communication charge.

2. The system of claim 1, wherein the billing signal is set automatically by the communication device used by the verified professional.

3. The system of claim 1, wherein the communication request is one selected from a group consisting of a request to connect a voice call, a request to transmit a text message, and a request to transfer funds to the verified professional.

4. The system of claim 1, wherein the registered device ID is a first phone number, and wherein the subscriber ID is a second phone number.

5. The system of claim 1, wherein the verified professional is one selected from a group consisting of a media personality, a physician, and a professional athlete.

6. The system of claim 1, further comprising a telecommunication system used by the central tracking system to communicate with the subscriber communication device and the communication device used by the verified professional.

7. The system of claim 1, wherein the plurality of verification data comprises a license number for the verified professional.

8. The system of claim 7, wherein the subscriber contacts the verified professional using the license number.

9. A method for billing communications between a subscriber and a verified professional comprising:
   obtaining a plurality of verification data for the verified professional;
   verifying, based on the plurality verification data, at least one selected from a group consisting of an identity of the verified professional and a credential of the verified professional to generate a verified professional repository that matches an individual sought by the subscriber;
   storing, in the verified professional repository, the verification data and a registered device identification (ID) associated with a communication device used by the verified professional;
   receiving a communication request targeting the registered device ID from a subscriber communication device, wherein the subscriber communication device is associated with a subscriber ID;
   determining an applied billing rate using a value set by the verified professional;
   transmitting the applied billing rate to the subscriber communication device;
   initiating a connection between the subscriber communication device and the communication device used by the verified professional;
   tracking the connection to obtain a connection duration and a billing signal;
   terminating the connection between the subscriber communication device and the communication device used by the verified professional;
   generating a communication data file comprising the registered device ID, the subscriber ID, the applied billing rate, the connection duration, and the billing signal;
   obtaining a billable duration by parsing the communication data file using the billing signal and the connection duration;
   calculating a communication charge using the applied billing rate and billable duration; and
   paying the verified professional a portion of the communication charge.

10. The method of claim 9, wherein the billing signal is sent automatically by the communication device used by the verified professional.

11. The method of claim 9, wherein the communication request is one selected from a group consisting of a request to connect a voice call, a request to transmit a text message, and a request to transfer funds to the verified professional.

12. The method of claim 9, wherein the registered device ID is a first phone number, and wherein the subscriber ID is a second phone number.

13. The method of claim 9, wherein the verified professional is one selected from a group consisting of a media personality, a physician, and a professional athlete.

14. The method of claim 9, wherein the central tracking system communicates with the subscriber communication device and the communication device used by the verified professional via a telecommunication system.

15. The method of claim 9, wherein the plurality of verification data comprises a license number for the verified professional.

16. The method of claim 15, wherein the subscriber contacts the verified professional using the license number.

17. A non-transitory computer readable medium comprising instructions for billing communications between a subscriber and a verified professional, wherein the instructions, when executed, perform a method, the method comprising:
  obtaining a plurality of verification data for the verified professional;
  verifying, based on the plurality verification data, at least one selected from a group consisting of an identity of the verified professional and a credential of the verified professional to generate a verified professional repository that matches an individual sought by the subscriber;
  storing, in the verified professional repository, the verification data and a registered device identification (ID) associated with a communication device used by the verified professional;
  receiving a communication request targeting the registered device ID from a subscriber communication device, wherein the subscriber communication device is associated with a subscriber ID;
  determining an applied billing rate using a value set by the verified professional;
  transmitting the applied billing rate to the subscriber communication device;
  initiating a connection between the subscriber communication device and the communication device used by the verified professional;
  tracking the connection to obtain a connection duration and a billing signal;
  terminating the connection between the subscriber communication device and the communication device used by the verified professional;
  generating a communication data file comprising the registered device ID, the subscriber ID, the applied billing rate, the connection duration, and the billing signal;
  obtaining a billable duration by parsing the communication data file using the billing signal and the connection duration;
  calculating a communication charge using the applied billing rate and billable duration; and
  paying the verified professional a portion of the communication charge.

18. The non-transitory computer readable medium of claim 17, wherein the billing signal is sent automatically by the communication device used by the verified professional.

19. The non-transitory computer readable medium of claim 17, wherein the communication request is one selected from a group consisting of a request to connect a voice call, a request to transmit a text message, and a request to transfer funds to the verified professional.

20. The non-transitory computer readable medium of claim 17, wherein the registered device ID is a first phone number, and wherein the subscriber ID is a second phone number.

21. The non-transitory computer readable medium of claim 17, wherein the verified professional is one selected from a group consisting of a media personality, a physician, and a professional athlete.

* * * * *